(12) United States Patent
Wong

(10) Patent No.: US 11,750,756 B1
(45) Date of Patent: Sep. 5, 2023

(54) CONTACTLESS DOCUMENT PROCESSING SYSTEM USING DOCUMENT MANAGEMENT PROFILE

(71) Applicant: Kyocera Document Solutions Inc., Osaka (JP)

(72) Inventor: Benny Wong, Dublin, CA (US)

(73) Assignee: Kyocera Document Solutions Inc., Osaka (JP)

( * ) Notice: Subject to any disclaimer, the term of this patent is extended or adjusted under 35 U.S.C. 154(b) by 0 days.

(21) Appl. No.: 17/704,750

(22) Filed: Mar. 25, 2022

(51) Int. Cl.
| H04N 1/00 | (2006.01) |
| H04N 1/44 | (2006.01) |
| H04N 1/04 | (2006.01) |

(52) U.S. Cl.
CPC ............ H04N 1/0097 (2013.01); H04N 1/04 (2013.01); H04N 1/4426 (2013.01); H04N 2201/0094 (2013.01)

(58) Field of Classification Search
CPC .... G06F 3/1222; G06F 3/1238; G06F 3/1204; G06F 3/1205; G06F 3/1267; G06F 3/1257; G06F 3/0488; G06F 3/1253; G06F 21/608; G06F 3/01; G06F 3/1239; G06F 3/1207; G06F 3/1292; G06F 21/31; G06F 21/629; G06F 3/1202; G06F 3/121; G06F 3/1218; G06F 3/1226; G06F 3/1231; G06F 3/1259; G06F 3/126; G06F 3/1285; G06F 3/1286; G06F 3/1234; G06F 3/1236; G06F 3/12; H04N 1/4413; H04N 2201/0094; H04N 1/00244; H04N 1/4433; H04N 1/00832; H04N 1/00177; H04N 1/00411; H04N 1/00204; H04N 1/4406; H04N 2201/0039; H04N 1/00477; H04N 1/0048; H04N 1/00973; H04N 1/4426; H04N 2201/0075; H04N 1/00076; H04N 1/00209; H04N 1/00217; H04N 1/0035; H04N 1/00689; H04N 1/32106; H04N 2201/0074; H04N 2201/3235; H04N 2201/3269; H04N 2201/3273; H04N 2201/3278; H04L 63/10; H04L 63/083; G03G 15/50; G03G 15/5016; H04W 4/80; H04M 1/72412; H04M 2250/06
USPC ........................................................ 358/496
See application file for complete search history.

(56) References Cited

U.S. PATENT DOCUMENTS

| 7,494,067 B1 * | 2/2009 | Zhu ...................... G06Q 20/352 |
| | | 235/487 |
| 8,613,070 B1 * | 12/2013 | Borzycki .............. H04L 67/104 |
| | | 726/8 |
| 9,158,785 B1 * | 10/2015 | Rudkowski ......... H04L 67/1095 |
| 10,187,542 B1 * | 1/2019 | Fielding ............ H04N 1/00135 |
| 10,708,358 B1 * | 7/2020 | Diasti ................... G06F 40/106 |

(Continued)

*Primary Examiner* — Negussie Worku
(74) *Attorney, Agent, or Firm* — Millen, White, Zelano & Branigan, P.C.; William Nixon

(57) ABSTRACT

A cloud based server includes user profiles having user policies and an organization policy for printing and scanning operations. These policies enable contact-free printing and scanning to occur on connected devices. A user logs onto a device using a contactless input device. The user policies are reviewed to determine if contact-free printing or scanning is enabled. If so, then the device performs these operations without the need for input or any interaction at the device. The policies also log off the user from the device when operations are complete.

20 Claims, 13 Drawing Sheets

(56) References Cited

U.S. PATENT DOCUMENTS

| | | | |
|---|---|---|---|
| 2010/0111301 A1* | 5/2010 | Wanderley | G06F 21/608 |
| | | | 380/243 |
| 2010/0241541 A1* | 9/2010 | Ito | G06Q 30/04 |
| | | | 705/412 |
| 2015/0370517 A1* | 12/2015 | Tokumaru | G06F 3/1236 |
| | | | 358/1.15 |
| 2016/0253557 A1* | 9/2016 | Kaminogo | G06V 40/1365 |
| | | | 382/116 |
| 2019/0095141 A1* | 3/2019 | Yoshihara | G06F 3/0488 |
| 2019/0332334 A1* | 10/2019 | Yoshihara | G06F 3/1231 |
| 2020/0241541 A1* | 7/2020 | McCawley | B60W 30/16 |
| 2021/0089247 A1* | 3/2021 | Nakajima | G06F 3/126 |
| 2021/0289103 A1* | 9/2021 | Mizuno | H04N 1/444 |
| 2022/0303428 A1* | 9/2022 | Kubota | H04N 1/32106 |

* cited by examiner

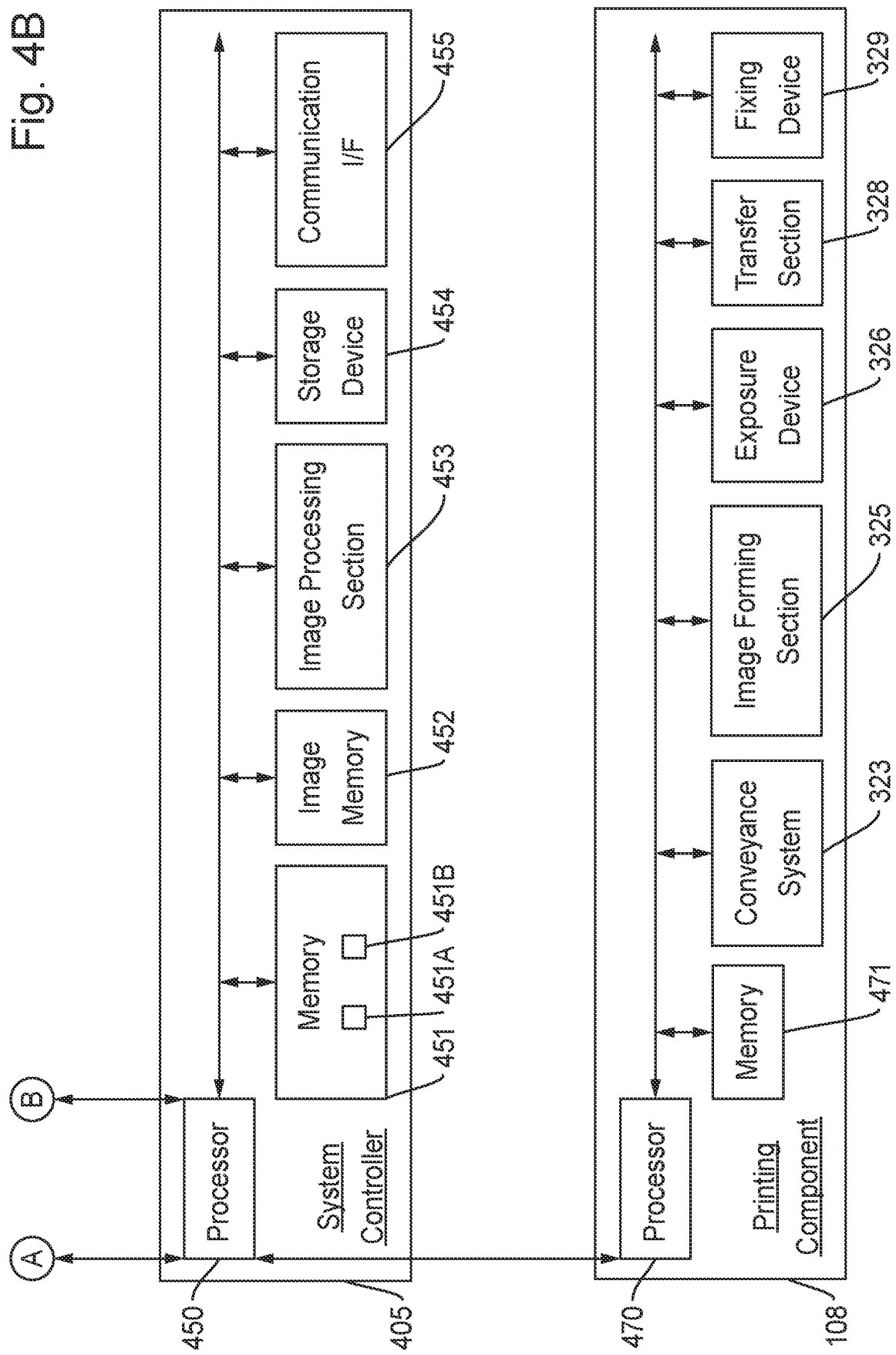

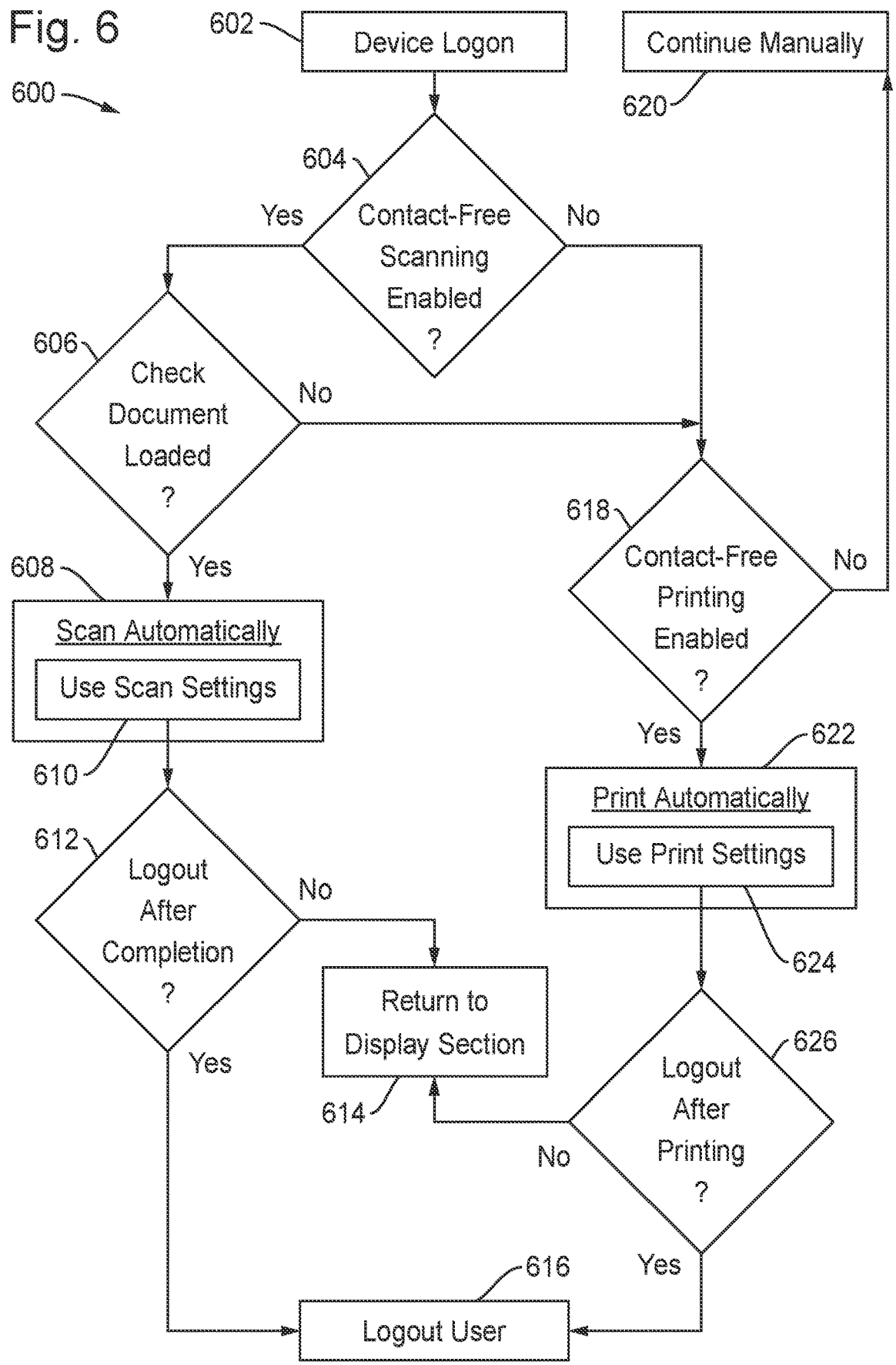

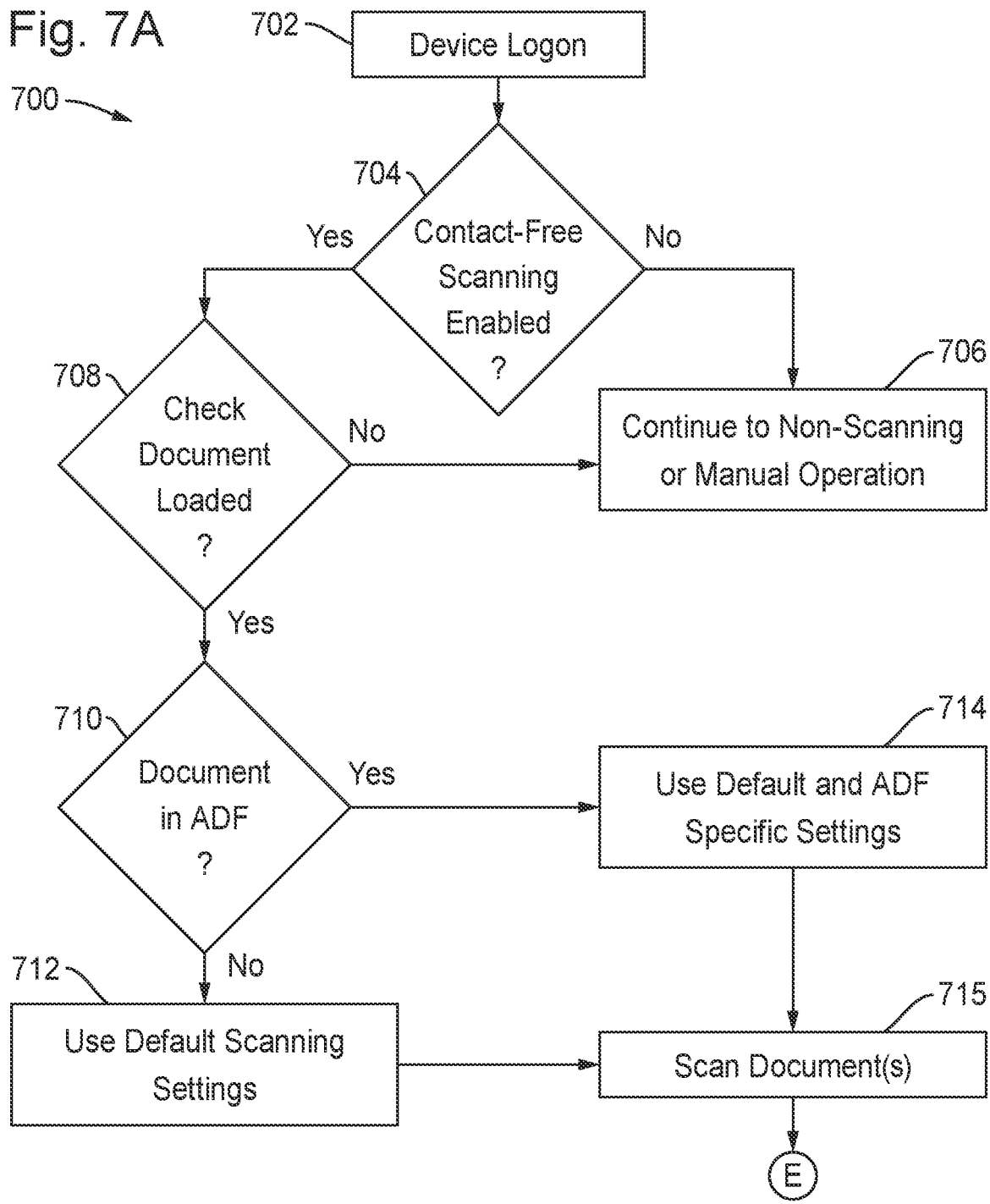

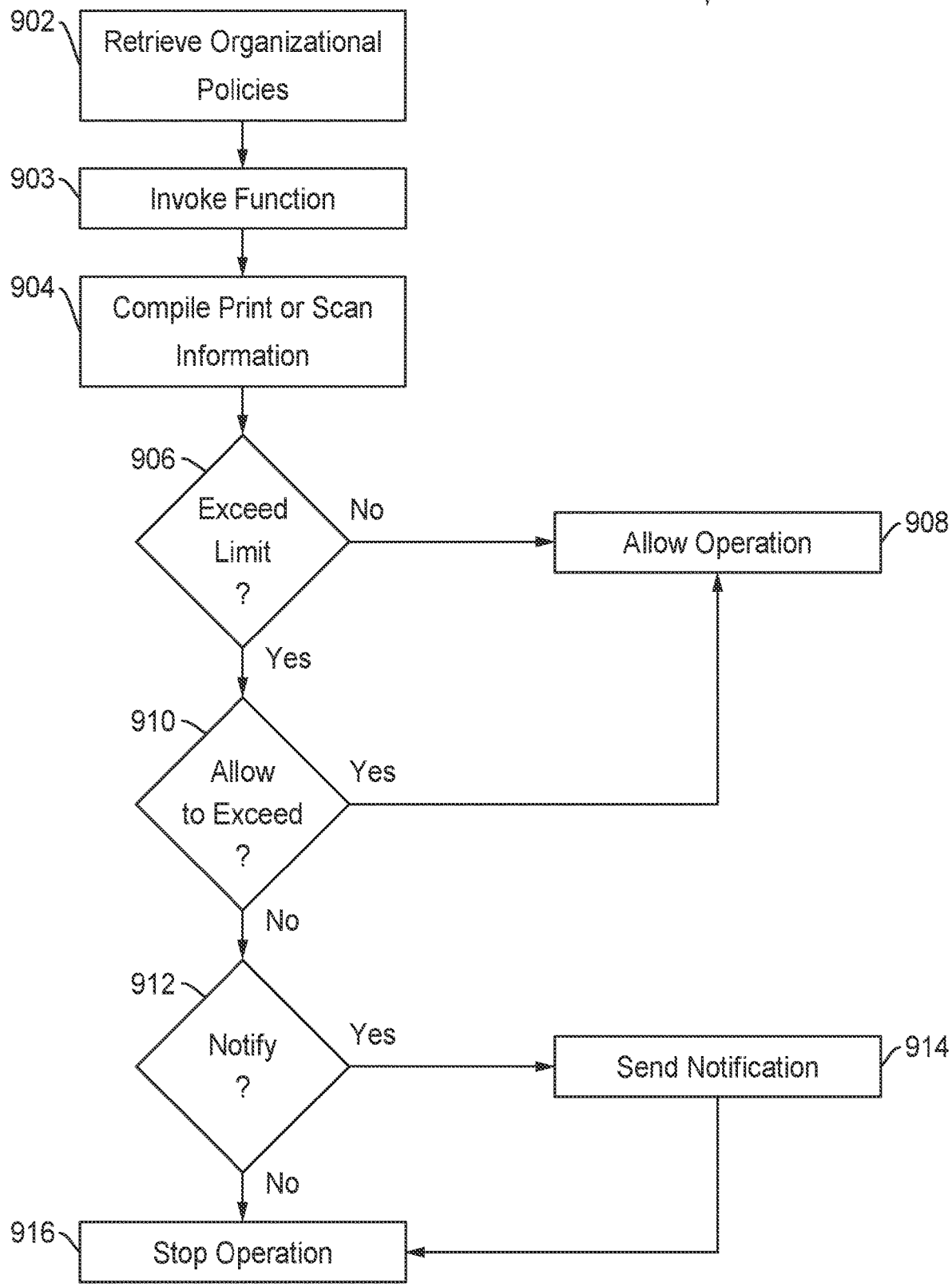

CONTACTLESS DOCUMENT PROCESSING SYSTEM USING DOCUMENT MANAGEMENT PROFILE

FIELD OF THE INVENTION

The present invention relates to a document processing system that scans and prints documents using a cloud based storage in a contactless manner More specifically, the present invention relates to scanning and printing documents without the need for input into a device using a document management profile.

DESCRIPTION OF THE RELATED ART

More and more services are being conducted in a contactless manner. Contactless may be defined as no need to touch a surface, screen, or component of a device with a person's hand, fingers, palm, or the like. Contactless operation of printing and scanning systems, however, is not usually completely contactless. Even when contactless login or payment is available, a user still needs to operate the onboard device panel for tasks such as job selection, print preferences, scan preferences, and the like. Some existing systems use fully contactless operation through a companion application that requires the user to operate a separate device, such as a mobile device or tablet. By connecting the application with the printing or scanning system, the separate device allows the user to remotely operate the device panel, or select a workflow that is pre-defined.

Partially contactless operation is not a replacement for fully contactless operation. As noted above, a requirement of a separate device for every user to achieve contactless operation may not be feasible or economical. Further, not every user wants to use applications to perform printing and scanning operations. Moreover, the mobile device may need to connect to multiple devices if the user is moving about their workplace or location. Multiple devices may try to access the printing or scanning device at the same time. These operations are not more convenient than touching screens or interacting with the device using contact.

SUMMARY OF THE INVENTION

A method for printing a document at a printing device is disclosed. The method includes associating a user identification with a user profile at a printing device. The user identification is entered in contactless manner to the printing device. The method also includes accessing the user profile at a cloud based storage. The user profile includes a document management policy. The method also includes determining a document to print according to the user profile. The method also includes invoking a function for printing the document according to the document management policy. The method also includes processing the document at the printing device by implementing the function.

A method for managing documents from a cloud based storage is disclosed. The method includes accessing a user profile at the cloud based storage for a document processing system. The user profile includes a document management policy. The method also includes determining if a first document is loaded onto a scanning device of the document processing system. The method also includes scanning the first document using scan settings specified by the document management policy. The method also includes forwarding the first document to a location within the document processing system according to the document management policy. The method also includes determining a second document is listed to be printed in the user profile at the cloud based storage. The method also includes invoking print settings for printing the second document according to the document management policy. The method also includes receiving the second document at a printing device of the document processing system. The method also includes automatically printing the second document at the printing device using the print settings.

A method for printing documents from a cloud based storage is disclosed. The method includes associating a user identification received at a printing device using a contactless input device with a user profile. The method includes accessing the user profile at the cloud based storage. The user profile includes a document management policy having print settings. The method also includes determining a plurality of documents listed to be printed at the user profile. The method also includes arranging the plurality of documents into an ordered hierarchy according to the document management policy. The method also includes receiving the plurality of documents at the printing device. The method also includes automatically printing the plurality of documents at the printing device according to the ordered hierarchy and the print settings specified by the document management policy.

A method for scanning documents at a scanning device is disclosed. The method includes associating a user identification with a user profile at a scanning device. The user identification is entered using a contactless input device at the scanning device. The method also includes accessing the user profile at a cloud based storage. The user profile includes a document management policy. The method also includes determining a document to be scanned at the scanning device. The document to be scanned is loaded onto a component of the scanning device. The method also includes invoking a function for scanning the document according to the document management policy. The method also includes specifying scan settings by the document management policy based on the component of the scanning device. The method also includes scanning the document by the scanning device. The method also includes forwarding the document from the scanning device according to the document management policy.

A method for scanning documents is disclosed. The method includes associating a user identification with a user profile. The user identification is entered using a contactless input device at the scanning device. The method also includes determining a document is loaded onto a component at the scanning device. The method also includes accessing the user profile at a cloud based storage. The user profile includes a document management policy. The method also includes specifying scan settings for the scanning device according to the document management policy. The method also includes automatically scanning the document at the scanning device using the scan settings. The method also includes forwarding the document to a destination according to the document management policy.

A scanning system is disclosed. The scanning system includes a cloud based storage. The cloud based storage includes a user profile having a document management policy having scan settings. The scanning system also includes a scanning device having a contactless input device. The scanning device is configured to receive a user identification using the contactless input device. The scanning device also is configured to forward the user identification to the cloud based storage. The scanning device also is configured to determine a document to be scanned. The scanning device also is configured to scan the document using the scan settings according to the document management policy. The cloud based storage is configured to associate the user identification with the user profile. The cloud based storage also is configured to invoke a function for scanning the document according to the document management policy. The cloud based storage also is configured to instruct the scanning device to implement the function.

BRIEF DESCRIPTION OF THE DRAWINGS

Various other features and attendant advantages of the present invention will be more fully appreciated when considered in conjunction with the accompanying drawings.

FIG. 4B further illustrates the block diagram of an example control system for the MFP according to the disclosed embodiments.

FIG. 6 illustrates a flowchart for implementing a hierarchical workflow for contactless document management operations at a device or component according to the disclosed embodiments.

FIG. 7A illustrates a flowchart for scanning one or more documents using the user policies according to the disclosed embodiments.

FIG. 9 illustrates a flowchart for implementing limits for scanning or printing operations using an organizational policy for contactless document management services according to the disclosed embodiments.

DETAILED DESCRIPTION OF THE PREFERRED EMBODIMENTS

Reference will now be made in detail to specific embodiments of the present invention. Examples of these embodiments are illustrated in the accompanying drawings. Numerous specific details are set forth in order to provide a thorough understanding of the present invention. While the embodiments will be described in conjunction with the drawings, it will be understood that the following description is not intended to limit the present invention to any one embodiment. On the contrary, the following description is intended to cover alternatives, modifications, and equivalents as may be included within the spirit and scope of the appended claims.

The disclosed embodiments are an extension of a printing system and a document management system, which allows configurable and automatic invocation of printing system functions through policies. Policies are available in the document management system to allow users to dictate how the printing device should behave in the event of automated operations. The policies also may be used to dictate how a scanning device should behave as well. Printing system behavior during automatic operation may be changed based on policies specified from the document management system.

The disclosed embodiments may use the term document processing system as well as the term document management system. Document processing system may be preferred so as to not cause confusion with other elements of the disclosed embodiments, such as the document management policy. A document processing system may include printing and scanning devices as well the functionality to allow for cloud printing and scanning Policies may impact how these processes are done, on an individual and group level.

The policies of the disclosed embodiments may be user-specific or applied to a logical grouping of users such as roles. The policies that apply to multiple users would be configurable by an administrator user that has privileges to apply organization-wide policies. Policies target events that typically require manual intervention, such as printing and scanning operations. When the event occurs within a device, the device will operate according to previously defined policies. Policies may optionally have settings dictating behavior with more granularity. When policies share the same trigger event but have conflicting behavior, they may be considered mutually exclusive policies, which are not allowed to be applied together.

Figure 1:
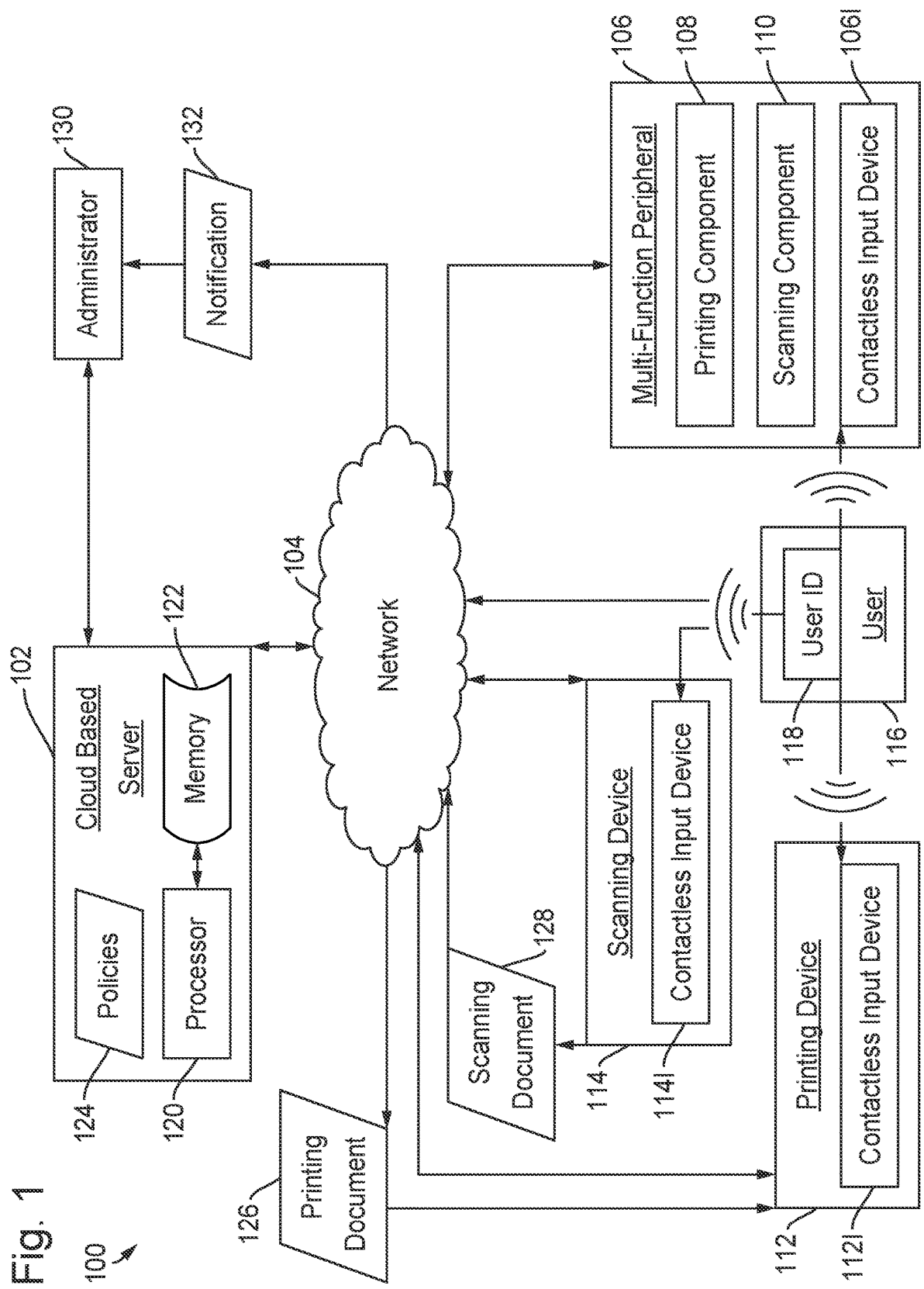
FIG. 1 illustrates a document processing system to implement policies for printing and scanning operations according to the disclosed embodiments.

FIG. 1 depicts a document processing system 100 to implement policies for printing and scanning operations according to the disclosed embodiments. Document processing system 100 includes cloud based server 102, which may manage printing and scanning operations within the system using policies 124. Policies 124 may be disclosed in greater detail below. Cloud based server 102 also includes a processor 120 and a memory 122. Memory 122 may store instructions that, when executed by processor 120, configure cloud based server 102 to perform certain functions. Cloud based server 102 also may provide instructions to other components within system 100 as defined by policies 124.

System 100 also may include multi-functional peripheral (MFP) 106. MFP 106 is disclosed in greater detail below by FIGS. 2-4. MFP 106 may include printing component 108 and scanning component 110. System 100 also includes printing device 112 and scanning device 114. These devices may perform printing operation and scanning operations, respectively, while MFP 106 may be able to perform both types of operations at a single device. Cloud based server 102 may communicate with MFP 106, printing device 112, and scanning device 114 via network 104.

A user 116 may desire to print a document, scan a document, or both. The disclosed embodiments allows user 116 to do so without touching any component, screen, part, or the like of MFP 106, printing device 112, or scanning device 114. User 116 logs onto a peripheral device using a contactless input device. Once logged on, the peripheral device queries cloud based server 102 via network 104 with the user identification 118 provided by user 116. Cloud based server 102 checks an applicable policy of policies 124 for a user profile associated with user identification 118. The policy sets forth actions that may be taken on behalf of user 116 at the applicable device. Thus, user 116 does not touch the device in order to perform printing or scanning operations as the instructions are provided by cloud based server 102 according to the applicable policy.

MFP 106 includes contactless input device 1061. Printing device 112 includes contactless input device 1121. Scanning device 114 includes contactless input device 1141. The contactless input devices may be devices that allow a reader scan a graphic provided on a card or mobile device of user 116. Alternatively, the contactless input devices may be card readers that allow user 116 to move a card having a magnetic strip or chip through the reader to provide information. The contactless input devices obtain user identification 118 from the card, graphic, barcode, magnetic strip, chip, and the like without the need for user 116 to input information directly at the applicable device.

The disclosed embodiments may use policies 124 to print or scan documents. For example, user 116 may log onto printing device 112 using contactless input device 1121. Contactless input device 1121 reads a QR code from a lanyard card of user 116. User identification 118 is determined from the QR code, which matches user 116. Printing device 112 provides user identification 118 to cloud based server 102. Cloud based server 102 looks up the user profile associated with user identification 118. Within user profile is one or more policies 124 that apply to user 116. The policies may be specific to the user or may be specific to a group of users including user 116. In addition, the user profile may list one or more documents for printing, as indicated by user 116. User 116 may select these documents to be printed using a document management service application. The documents are printed according to the instructions provided by the applicable policies 124.

An example user policy may invoke a function to enable print documents upon log on at printing device 112. Upon log on by user 116 to printing device 112, the printing device acquires printing policies 124 from cloud based server 102. Afterwards, printing device 112 will print each queued job from the user profile at cloud based server 102 until the end of the last job or a print limit. In other words, there may be a limit on the amount of printing available to user 116 as set forth by one or more policies 124. Thus, cloud based server 102 may send print document 126 to printing device 112 for printing as instructed by the applicable policy. The user policy also may invoke a function to enable log out after printing the last document. Upon printing the last print job, printing device 112 will log out user 116 automatically. User 116 does not need to enter information or press a button to stop printing.

For an organization or group policy, in addition to the above, this policy may invoke a function to enable print limit overrides upon exceeding a print limit. Upon reaching typical print limits, further printing operations are allowed to continue for specific users or groups. Specific users are allowed to exceed limits despite potentially incurring additional usage costs. These users may be supervisors or users having special jobs to complete. Further, policies 124 may be changed to allow such a function for a specified period of time. The group policy also may enable a function to enable notification 132 to administrator 130 for system 100. Cloud based server 102 may send notification 132 to organization administrator 130 for support automatically upon reaching the limit. Administrator 130 may override the limit to allow print document 126 to print at printing device 112. This policy may be mutually exclusive with policies allowing a user to exceed the limit.

In other embodiments, user 116 may access scanning device 114. Use of scanning device 114 differs from printing device 112. User 116 logs onto scanning device 114 using contactless input device 1141. Scanning device 114 obtains user identification 118 and forwards it to cloud based server 102. Cloud based server 102 associates user identification 118 with the user profile having policies 124. A policy may govern scanning operations for user 116.

For example, a policy may instruct scanning device 114 to determine if any documents are present at the device. One or more documents may be loaded into an automated document feeder (ADF) for scanning device 114. Alternatively, one or more documents, preferably a sheet, are placed on the platen glass for scanning device 114. Scanning device 114 may then be instructed to scan the one or more documents to generate scan document 128. Scan document 128 may be an image file of the document placed at scanning device 114. Thus, the policy may invoke a function to enable scanning of a loaded document upon log on by user 116. Upon user log on, scanning operations will commence if documents are loaded onto the platen glass or the ADF.

The policy also may include additional settings required to complete scans automatically, such as destination settings and scan settings. Destination settings pertain to where scan document 128 is sent after scanning is complete. Destination settings may specify cloud based server 102 or another location within system 100 to receive scan document 128. For cloud based server 102, the policy may instruct the server to store scan document 128 with the associated user profile. Alternatively, the policy may instruct scanning device 114 to send scans of "small" documents directly to email for user 116. These features prevent large scan jobs from cluttering the email (and associated email server) account.

Scan settings may specify scanning features, such as grayscale, resolution, and the like. Scanning device 114 implements the scan settings set forth by the policy. In other embodiments, the policy may override scan settings for documents coming from different scanner source, such the ADF as opposed to the platen glass. The policy also may invoke a function to enable log out after scanning operations are complete. When the last document is scanned, scanning device 114 will log out user 116 automatically. This feature allows scanning device 114 to be made available in an efficient manner.

The log out feature for printing device 112 and scanning device 114 may be desirable as user 116 may leave the vicinity of the devices. User 116 does not need to physically press a button to release the device to perform other operations. The policy instructs the device to log out as soon as operations are completed. Thus, the applicable device is returned to system 100 for use.

Policies 124 also include group or organization policies for scanning operations. Such a policy may enable a scan limit override upon exceeding a scan limit. Upon reaching typical scan limits, the disclosed embodiments may allow further scanning to continue for specific users or groups. The allowance of specific users to exceed limits may happen despite potentially incurring additional usage costs. The policy also may invoke a function to enable notification 132 be sent to administrator 130 upon exceeding the scan limit. Notification 132 is sent to administrator 130 for support automatically upon reaching the scan limit. Administrator 130 may take action to allow scanning operations to continue or modify policies 124 to allow the override. This policy may be mutually exclusive with policies allowing the scan limits to be exceeded.

Administrator 130 may set the parameters for policies 124 within an organization. The administrator also may set up the groups of users applicable to policies 124 that deal with organization level issues. Administrator 130 also may set limits for users 116 for printing and scanning Administrator 130 may access cloud based server 102 remotely to manage policies 124.

It should be noted that MFP 106 includes printing component 108 and scanning component 110. Printing component 108 may operate within document processing system 100 much like printing device 112. Policies 124 set forth functions and limits available at MFP 106 for printing operations. Scanning component 110 may operate much like scanning device 114. Print document 126 may be received at MFP 106 and scan document 128 sent from MFP 106, depending what is being done by user 116. Policies 124 may create a hierarchy of actions to be done at MFP 106 so that operations do not interfere with each other. This feature is disclosed in greater detail below.

Figure 2:
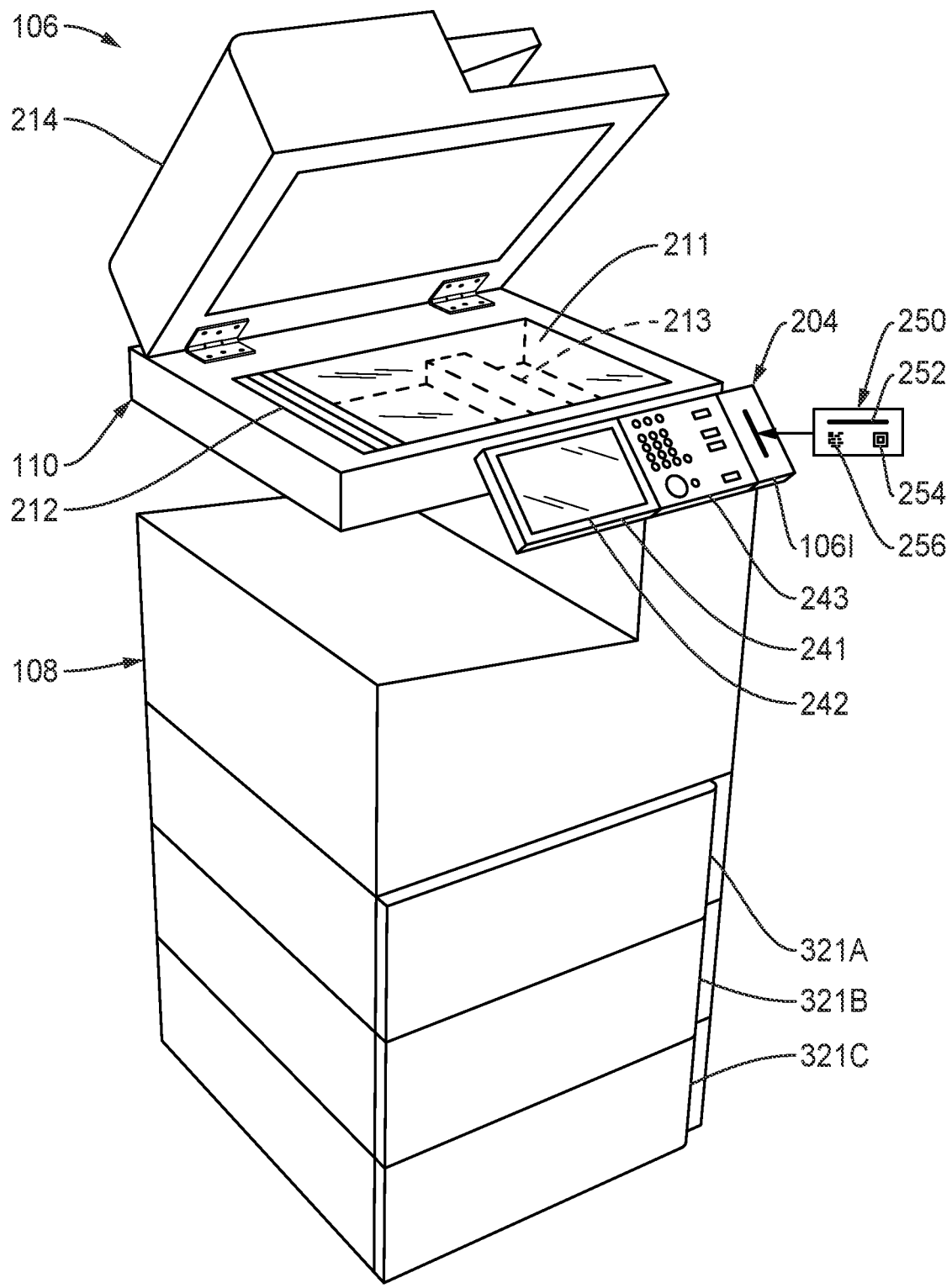
FIG. 2 illustrates a perspective view of a multi-functional peripheral (MFP) as an image forming apparatus according to the disclosed embodiments.
Figure 3:
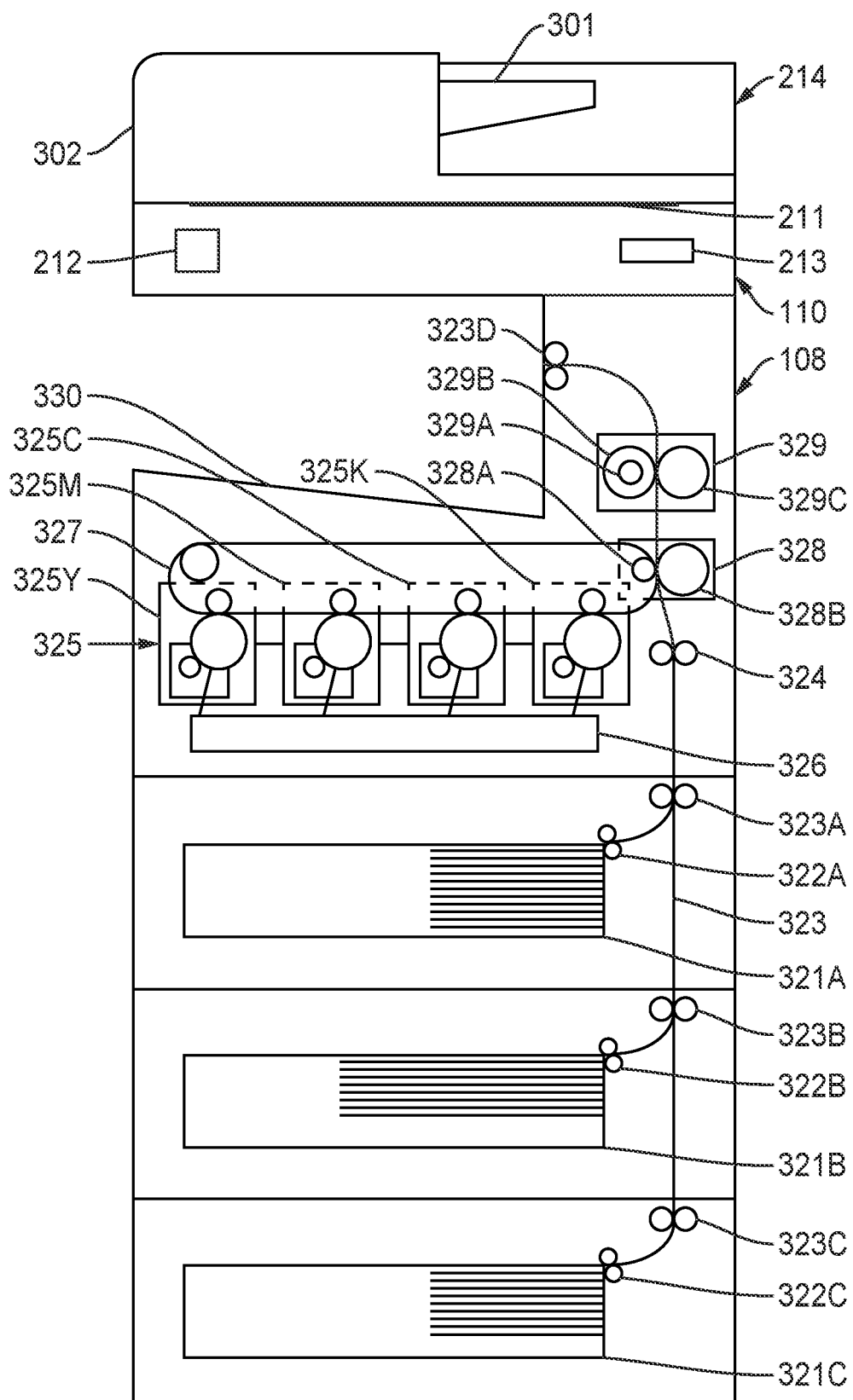
FIG. 3 illustrates a cross-sectional view of the MFP according to the disclosed embodiments.

FIG. 2 depicts a perspective view of MFP 106 as an image forming apparatus according to the disclosed embodiments. FIG. 3 depicts a cross-sectional view of MFP 106 according to the disclosed embodiments. As shown in FIG. 2, MFP 106 includes scanning component 110, printing component 108, and an operation panel 204. Scanning component 110 is provided at an upper part of a main body of MFP 106. Scanning component 110 has a document table, or platen, glass 211 on which a document to be scanned is placed. Scanning component 110 includes an image reading mechanism that scans the document on platen glass 211.

Scanning component 110 also includes a carriage 212 and a photoelectric conversion section 213. Carriage 212 and photoelectric conversion section 213 are provided below platen glass 211. Carriage 212 includes an illumination 462, as shown in FIG. 4 and an optical system such as a mirror. Illumination 462 is provided in carriage 212 to irradiate a reading position on platen glass 211 with light. The reading position on platen glass 211 irradiated by illumination 462 with the light is an image corresponding to one line, or a plurality of lines, in a main scanning direction. The optical system such as a mirror provided in carriage 212 guides a light, or reflected light, from the reading position irradiated by illumination 462 to photoelectric conversion section 213.

Carriage 212 is moved in a sub-scanning direction below platen glass 211 by a movement mechanism 463, as shown in FIG. 4, including a stepping motor or the like. A position of carriage 212 is determined in an initial operation, and the movement thereof in the sub-scanning direction is controlled based on the determined position. For example, carriage 212 is moved in the sub-scanning direction to continuously guide an image of each line in the main scanning direction in a document reading area on platen glass 211 wherein the document is placed to photoelectric conversion section 213.

Photoelectric conversion section 213 includes a lens, a photoelectric conversion sensor, and a cover. The lens condenses the light guided by the optical system of carriage 212 to guide the light to the photoelectric conversion sensor. The photoelectric conversion sensor includes photoelectric conversion elements. The photoelectric conversion sensor, for example, may be a line sensor in which charge coupled devices (CCDs) or contact image sensors (CISs) as photoelectric conversion elements are arranged in a line. The line sensor as the photoelectric conversion sensor converts the image corresponding to one line in the main scanning direction, reflected light by a document surface, into pixel data corresponding to one line.

Carriage 212 includes an exposure lamp and the optical system, such as a mirror, and is moved below platen glass 211 in the sub-scanning direction. Carriage 212 moves the reading position on platen glass 211 leading to photoelectric conversion section 213 in the sub-scanning direction. Specifically, scanning component 110 adjusts the reading of the image in the sub-scanning direction by controlling the movement of carriage 212. Scanning component 110 reads the image of the entire document be acquiring the image data in the main scanning direction converted by photoelectric conversion section 213 while moving carriage 212 in the sub-scanning direction.

Scanning component 110 also includes ADF 214. ADF 214 also functions as a document table cover and is provided in an openable manner. When ADF 214 is closed, it covers the entire document reading area on platen glass 211. ADF 214 includes a sheet feed tray 301 and a conveyance system 302, as illustrated in FIG. 3. Sheet feed tray 301 of ADF 214 holds a document of sheets to be read. Conveyance system 302 of ADF 214 picks up the sheets of the document set in sheet feed tray 301 one by one to convey them so that a reading surface of each sheet taken out passes through a predetermined reading position. Using this process, scanning component 110 may generate scan document 128.

As illustrated in FIG. 3, printing component 108 includes sheet feed cassettes 321A, 321B, and 321C. Additional feed cassettes may be loaded onto MFP 106. Each of sheet feed cassettes 321A, 321B, and 321C accommodates a sheet as an image forming medium on which an image is to be printed. For example, each of sheet feed cassettes 321A, 321B, and 321C is detachable from the lower part of MFP 106. Sheet feed cassettes 321A, 321B, and 321C have sheet feed rollers 322A, 322B, and 322C, respectively. Sheet feed rollers 322A, 322B, and 322C pick up sheets one by one from sheet feed cassettes 321A, 321B, and 321C, respectively.

Conveyance system 323 conveys a sheet in printing component 108. Conveyance system 323 includes a plurality of conveyance rollers 323a, 323b, 323c, and 323d as well as a registration roller 324. Conveyance system 323 conveys the sheet taken from sheet feed rollers 322A, 322B, or 322C to registration roller 324. Registration roller 324 conveys the sheet to a transfer position in accordance with a timing at which an image is transferred.

An image forming section 325 includes a plurality of image forming sub-sections 325Y, 325M, 325C, and 325K to form images of respective colors (yellow, magenta, cyan, and black). An exposure device 326 forms an electrostatic latent image as an image to be developed in each color on each image carrier in each of image forming sub-sections 325Y, 325M, 325C, and 325K. Exposure device 326 forms the electrostatic latent image on the image carrier by exposing the image carrier with the light emitted in response to the image data. For example, exposure device 326 exposes a photoconductive drum as the image carrier in the main scanning direction by irradiating the photoconductive drum via a rotating polygon mirror with the light emitted by a light emitting section. The irradiation position of the light from exposure device 326 moves in the sub-scanning direction as the photoconductive drum rotates. Specifically, a position and magnification of an image formed by image forming section 325 are adjusted by controlling exposure device 326.

Image forming sub-sections 325Y, 325M, 325C, and 325K develop electrostatic latent images on the respective image carriers with toners of respective colors (yellow, magenta, cyan, and black). Intermediate transfer belt 327 is an intermediate transfer member. Image forming sub-sections 325Y, 325M, 325C, and 325K transfer toner or ink images for respective colors developed with the toners or inks of respective colors on respective image carriers onto intermediate transfer belt 327, or the primary transfer.

Intermediate transfer belt 327 conveys the transferred toner or ink image to a secondary transfer position while holding the toner or ink image. The secondary transfer position is a position where the toner or ink image on intermediate transfer belt 327 is transferred onto a sheet. At the secondary transfer position, a support roller 328a and secondary roller 328b face each other. Support roller 328a and secondary transfer roller 328b constitute a transfer section 328. Registration roller 324 conveys the sheet to the secondary transfer position in accordance with a timing at which the toner or ink image on intermediate transfer belt 327 is transferred. Transfer section 328 transfers the toner or ink image held on intermediate transfer belt 327 onto the sheet at the secondary transfer position.

For example, in the case of forming a color image, image forming sections 325Y, 325M, 325C, and 325K transfer toner or ink images developed with toners or inks of respective colors (yellow, magenta, cyan, and black) onto intermediate transfer belt 327 by overlapping the toner or ink images on the intermediate transfer belt. Intermediate transfer belt 327 holds a color image obtained by overlapping the toner or ink images for respective colors. Transfer section 328 transfers the color image formed with the toners or inks of plural colors on intermediate transfer belt 327 onto the sheet at the secondary transfer position. Registration roller 324 conveys the sheet to the second transfer position in according with a timing at which the toner or ink image on intermediate transfer belt 327 is transferred. As a result, the color image is transferred onto the sheet.

Transfer section 328 supplies the sheet onto which the toner or ink image is transferred to a fixing device 329. Fixing device 329 fixes the toner or ink image on the sheet. Fixing device 329 has a heating section 329a, a heat roller 329b, and a pressure roller 329c. Heating section 329a heats heat roller 329b. Heat roller 329b and pressure roller 329c perform a fixing processing of heating and pressurizing the sheet onto which the toner or ink image is transferred by transfer section 328. Heat roller 329b and pressure roller 329c of fixing device 329 transmit the sheet on which the fixing processing is performed to conveyance roller 323d. Conveyance roller 323d conveys the sheet from fixing device 329 to a sheet discharge section 330.

As illustrated in FIG. 2, operation panel 204 is a user interface. Operation panel 204 displays guidance and receives an input of an operation button or icon. For example, a user inputs setting information with operation panel 204. Operation panel 204 includes a display section, or display, 241, a touch panel 242, and a plurality of operation buttons 243. For example, touch panel 242 is provided on a display screen of display section 241. Touch panel 242 detects a portion touched by user 116 on the display screen of display section 241.

The disclosed embodiments may avoid the actions taken with regards to operations panel 204 by using contactless input device 1061. Instead of pushing buttons 243 or touching touch panel 242, the disclosed embodiments may obtain user identification 118 using contactless input device 1061. For example, a card 250 may be provided by user 116. Alternatively, card 250 may be a card attached to a lanyard normally carried by employees or people within an organization or location. Card 250 may be placed into contactless input device 1061 to provide information on user 116. Such information may be a user name 252, as shown on card 250. Contactless input device 1061 may associate user name 252 with user identification 118. Information associated with user 116 may be read by contactless input device 1061 from embedded chip 254 within card 250. It also may be read from graphical code 356. Graphical code 256 may be scanned by input device 1061 and may include a barcode, a QR code, and the like. In this way, user identification 118 is provided to MFP 106 without the need to make contact with any component, buttons, or screen thereon.

Figure 4A:
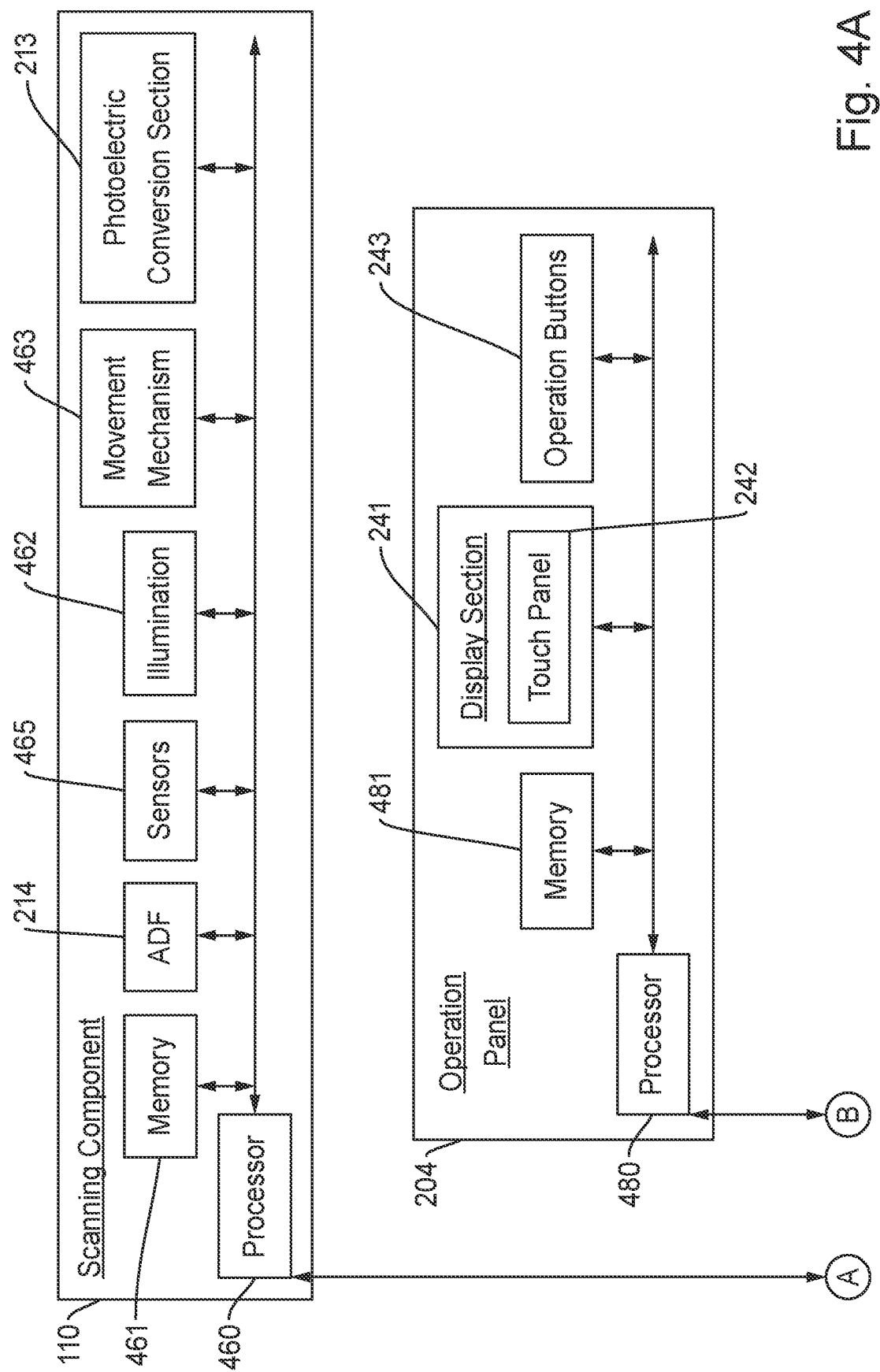
FIG. 4A illustrates a block diagram of an example control system for the MFP according to the disclosed embodiments.

FIGS. 4A and 4B depict a block diagram of an example control system for MFP 106 according to the disclosed embodiments. MFP 106 includes a system controller 405 that may control printing component 108, scanning component 110, and other components on the MFP. System controller 405 is connected to scanning component 110, printing component 108, and operation panel 204. As shown in FIGS. 4A and 4B, system controller 405 includes a processor 450, a memory 451, an image memory 452, an image processing section 453, a storage device 454, and a communication interface (I/F) 455.

Processor 450 is connected to processor 460 of scanning component 110, processor 470 of printing component 108, and processor 480 of operation panel 204 via applicable interfaces. Processor 450 may perform various processing functions by executing programs stored in memory 451 or storage device 454. For example, by executing a program stored in memory 451, processor 450 output an operation instruction to each section and processes various kinds of information from each section.

Memory 451 includes memories such as a random access memory (RAM), a read only memory (ROM), a non-volatile memory (NVM), and the like. The RAM functions as a working memory or a buffer memory. The ROM is a non-rewritable nonvolatile memory. The ROM functions at a program memory. The NVM is a rewriteable nonvolatile memory. The NVM stores setting data for scanning component 110 and printing component 108, and the like.

Memory 451 may include storage area 451a and storage area 451b. Storage area 451a and storage area 451b are rewritable nonvolatile memory areas. Storage area 451a stores information indicating a size of a sheet used for image adjustment in which a below-disclosed setting value to be stored is obtained. Storage area 451b stores sheet information used for correcting the setting value for the image adjustment.

Image memory 452 stores the image data. For example, image memory 452 functions as a page memory for copying or decompressing the image data to be processed. Image processing section 453 processes the image data. To output the processed image data, image processing section 453 performs image processing such as correction, compression, or decompression on the input image data to output the processed image data.

Storage device 454 stores control data, control programs, and data such as setting information. Storage device 454 is a rewritable nonvolatile memory. For example, storage device 454 may be a hard disk drive (HDD) or a solid state drive (SSD).

Communication I/F 455 is used for establishing data communication with an external device. For example, communication I/F 455 functions as an image acquisition section that acquires an image to be printed on the sheet from an external device such as a personal computer (PC). Communication I/F 455 also functions as an interface for communicating with a server, such as cloud based server 102.

An example of a configuration of a control system in scanning component 110 may be disclosed below. Scanning component 110 includes processor 460, memory 461, ADF 214, illumination 462, movement mechanism 463, and photoelectric conversion section 213. Processor 460 performs various kinds of processing by executing programs stored in memory 461. For example, by executing a program, processor 460 controls the operation of each section of scanning component 110, and monitors an operation state of each section. Processor 460 is connected to processor 450 of system controller 405. Processor 460 executes scanning processing in response to an operation instruction from system controller 405.

Memory 461 includes a RAM, a ROM, a data memory, and the like. The RAM functions as a working memory or a buffer memory. The ROM is a non-rewritable nonvolatile memory. The ROM functions as a program memory. The data memory is a rewritable nonvolatile memory.

ADF 214 has a pickup roller and a conveyance system 302 as a configuration of a control system. Processor 460 drives the pickup roller and conveyance system 302 to convey the documents one by one to the reading position. ADF 214 also may include sensors 465 located on sheet feed tray 301 to detect the presence of a document or sheets. Sensors 465 also may be located on or adjacent platen glass 211 to detect when a document or sheet is placed thereon. Sensors 465 may alert scanning component 110 that documents need to be scanned.

Illumination 462 is provided in carriage 212 to irradiate the reading position on platen glass 211 with light. Illumination 462 has a light source that emits light in response to a lighting instruction from processor 460. The light source is not limited to having a specific configuration. The light emitted by illumination 462 is reflected by the document placed on platen glass 211 and then enters photoelectric conversion section 213 via the optical system such as a mirror, a lens, and the like.

Movement mechanism 463 moves carriage 212. Movement mechanism 463 includes a stepping motor as a driving source and moves carriage 212 according to the driving of the stepping motor. Movement mechanism 463 moves carriage 212 in response to operation instructions from processor 460 or processor 450 of system controller 405. For example, at the time of scanning the document on platen glass 211, processor 460 moves carriage 212 from a reading start position in the sub-scanning direction (FWD direction).

Photoelectric conversion section 213 includes a photoelectric conversion sensor including photoelectric conversion elements for converting incident light into an electrical signal. Photoelectric conversion section 213 includes, for example, a photoelectric conversion sensor, which is a line sensor for generating pixel data corresponding to one line read in the main scanning direction. Photoelectric conversion section 213 also has a lens for inputting the light guided by the optical system provided in carriage 212 to the photoelectric conversion sensor. Specifically, the photoelectric conversion section 213 sequentially outputs the pixel data corresponding to each line read in the main scanning direction as carriage 212 moves in the sub-scanning direction.

An example of a configuration of a control system for printing component 108 is disclosed. Printing component 108 includes processor 470, memory 471, conveyance system 323, image forming section 325, exposure device 326, transfer section 328, and fixing device 329. Processor 470 performs various kinds of processing by executing programs stored in memory 471. For example, by executing a program, processor 470 controls the operation of each section of printing component 108 and monitors an operation state of each section. Processor 470 is connected to processor 450 of system controller 405 via the interface. Processor 470 executes a printing processing in response to an operation instruction from system controller 405.

Memory 471 includes memories such as a RAM, a ROM, a data memory, and the like. The RAM functions as a working memory or a buffer memory. The ROM is a non-rewritable nonvolatile memory. The ROM functions as a program memory. The data memory is a rewritable nonvolatile memory.

Conveyance system 323 conveys the sheet in printing component 108 under the control of processor 470. Specifically, conveyance system 323 drives conveyance rollers of the respective sections in response to an operation instruction from processor 470 to convey the sheet.

In response to the operation instruction from processor 470, exposure device 326 emits light, such as a laser light, for forming an electrostatic latent image on the photoconductive drum of each image forming section 325. Processor 470 adjusts a printing position and a magnification by controlling the irradiation position of the laser light on the photoconductive drum by exposure device 326. Processor 470 executes image adjustment such that a printing area becomes a desired printing area by performing operation control according to a printing area starting from a printing reference.

Image forming section 325 develops the electrostatic latent images formed on the photoconductive drums with toners or inks of respective colors in response to operation instructions from processor 470. Image forming section 325 transfers the toner or ink image formed on the photoconductive drum onto intermediate transfer belt 327, or the primary transfer. Transfer section 328 transfers the toner or ink image transferred onto intermediate transfer belt 327 onto the sheet, or the secondary transfer, in response to an operation instruction from processor 470.

Fixing device 329 drives heat roller 329*b* and pressure roller 329*c* in response to an operation instruction from processor 470. Heating section 329*a* of fixing device 329 heats the surface temperature of heat roller 329*b* to a desired fixing temperature under the control of processor 470. In a state in which fixing device 329 is controlled at the fixing temperature, fixing device 329 fixes the toner or ink image transferred onto the sheet.

An example of configuration of a control system for operation panel 204 is disclosed. Operation panel 204 includes a processor 480, memory 481, display section 241, touch panel 242, and operation buttons 243. Processor 480 performs various kinds of processing by executing programs stored in memory 481. For example, processor 480 executes a program to control the operation of each section of operation panel 204 and to monitor an operation state of each section. Processor 480 is connected to processor 450 of system controller 405. For example, processor 480 provides system controller 405 with information input by user 116, or read by contactless input device 1061.

Memory 481 includes memories such as a RAM, a ROM, a data memory, and the like. The RAM functions as a working memory or a buffer memory. The ROM is a non-rewritable nonvolatile memory. The ROM functions as a program memory. The data memory is a rewritable nonvolatile memory.

Display contents of display section 241 are controlled in response to an operation instructions from processor 480. Touch panel 242 is provided on the display screen of display section 241 to detect a touched position on the display screen. For example, processor 480 displays an operation guidance and icons capable of being selected with touch panel 242 on the display screen of display section 241. Processor 480 determines information input by user 116 according to the touched position detected by touch panel 242. Operation buttons 243 include hard keys such as a start key, a reset key, and the like.

According to the disclosed embodiments, printing component 108 and scanning component 110 may be operated without the need to use touch panel 242 or buttons 243. Instead, operations may be implemented by processors 460, 450, and 470 by policies 124 at cloud based server 102. In other words, the instructions implemented by the processors are fed to the various components from cloud based server 102 and does not require the need for user 116 to input any information or take any action beyond logging onto MFP 106.

It should be noted that the features disclosed for printing component 108 also are applicable for printing device 112. Printing device 112 may include components as disclosed in FIGS. 3 and 4 pertaining to printing component 108 including operation panel 204 and system controller 405. Further, the features disclosed for scanning component 110 also are applicable for scanning device 114. Scanning device 114 may include components as disclosed in FIGS. 3 and 4 pertaining to scanning component 110 including operation panel 204 and system controller 405.

Figure 5A:
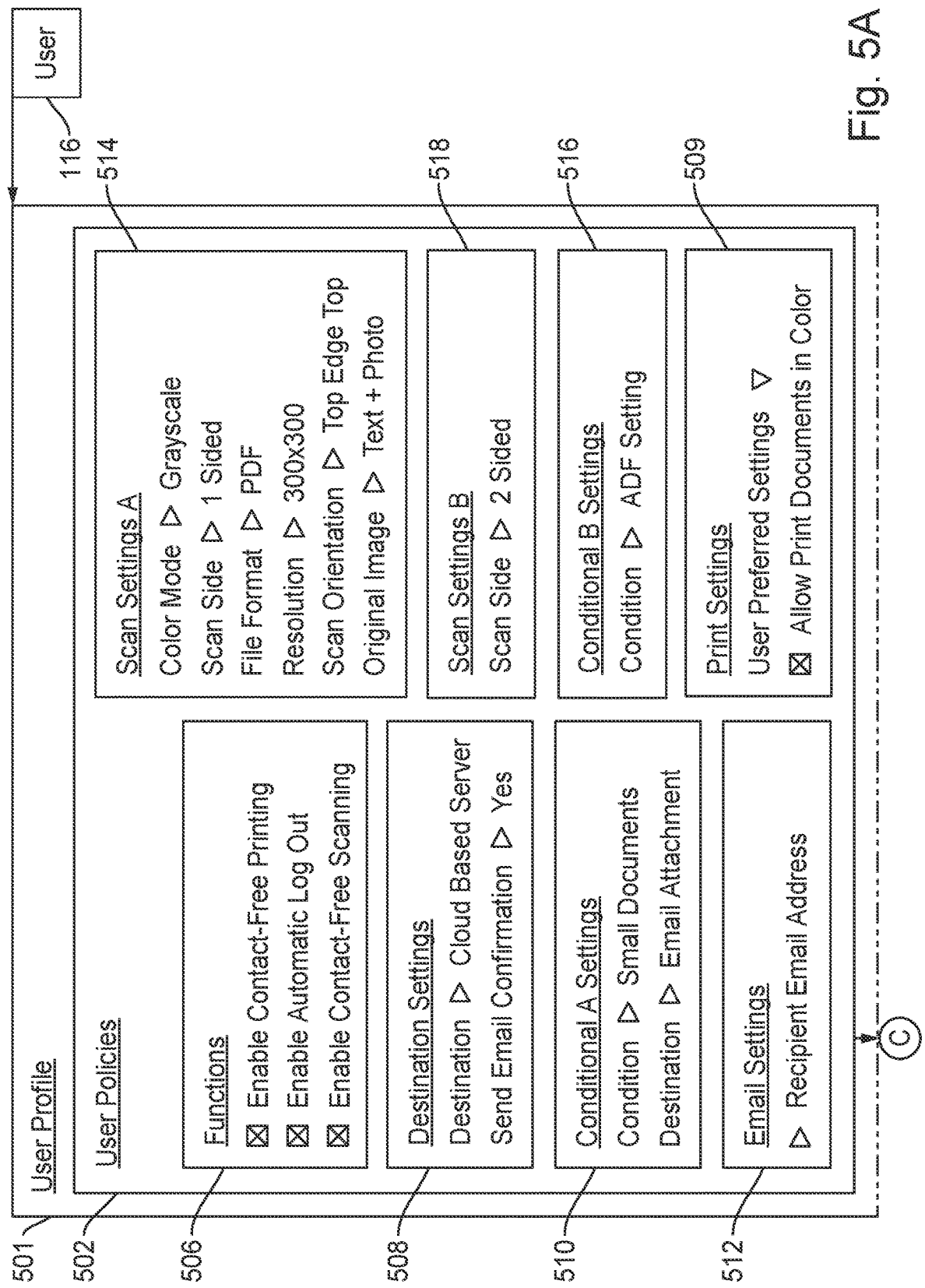
FIG. 5A illustrates an example implementation of the policies within the document processing system according to the disclosed embodiments.
Figure 5B:
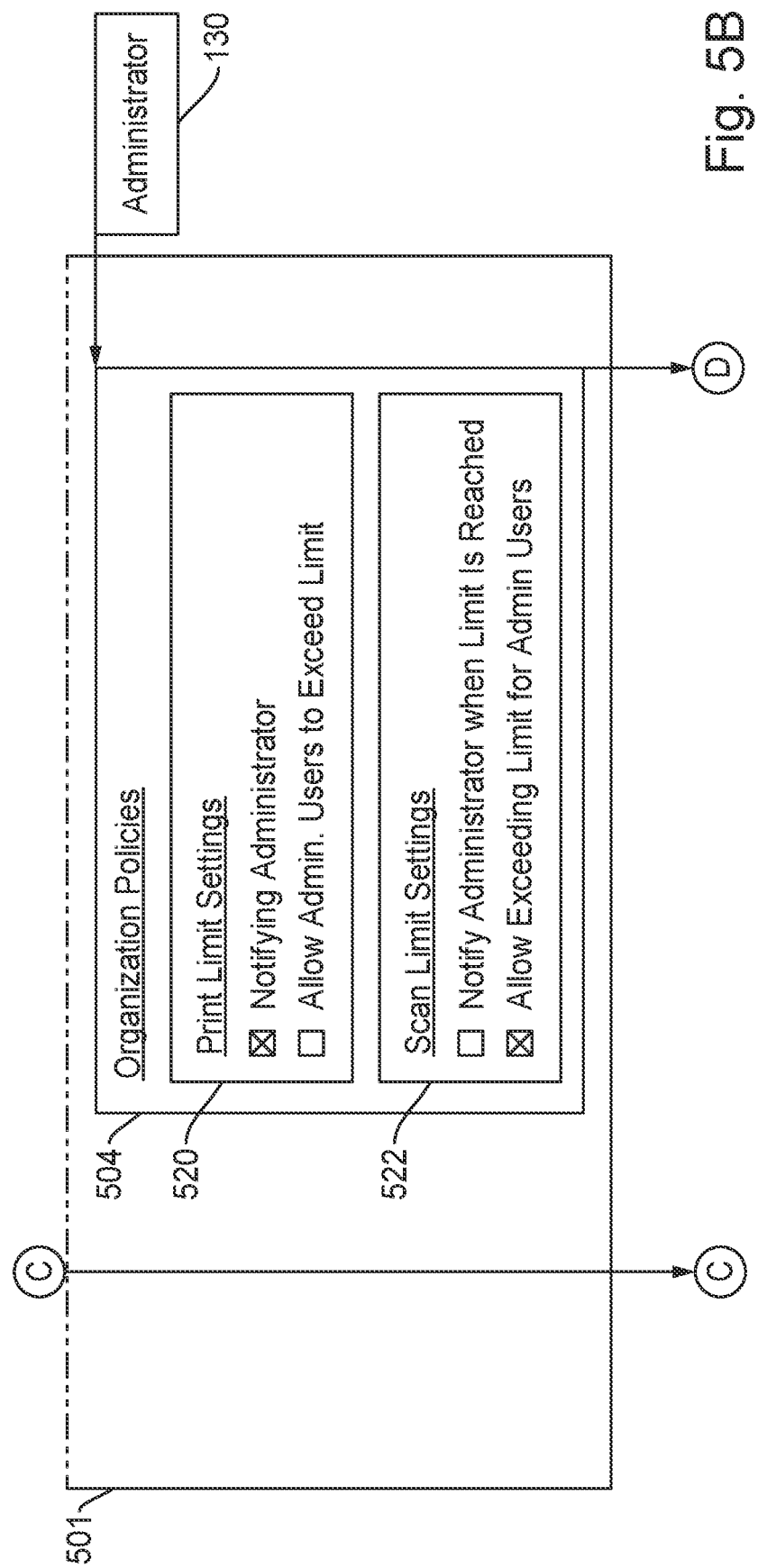
FIG. 5B further illustrates the example implementation of the policies within the document processing system according to the disclosed embodiments.
Figure 5C:
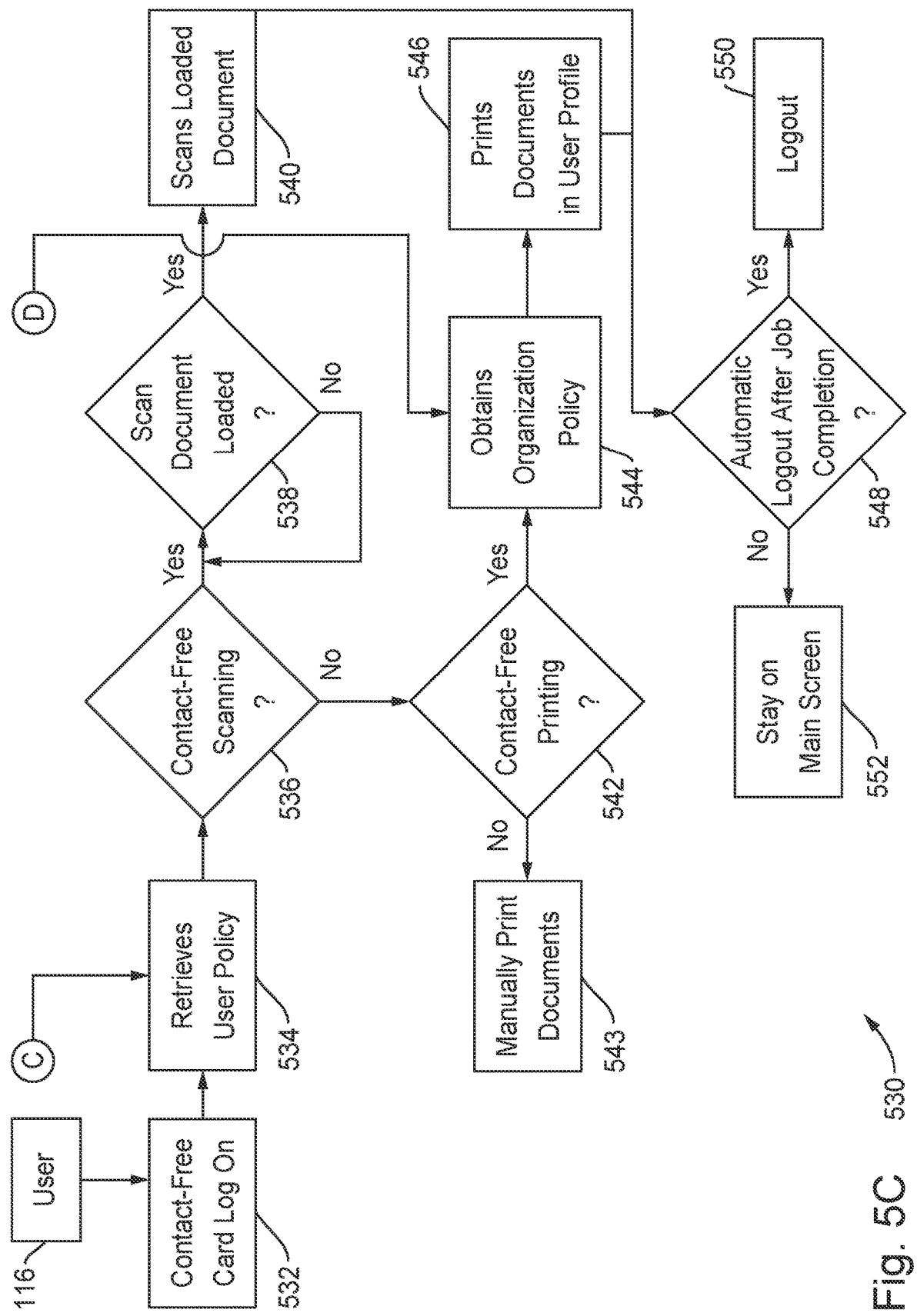
FIG. 5C further illustrates the example implementation of the policies within the document processing system according to the disclosed embodiments.

FIGS. 5A, 5B, and 5C depict an example implementation of policies 124 within document processing system 100 according to the disclosed embodiments. Policies 124 are stored in cloud based server 102 and may be broken into user policies 502 and organization policy 504. Policies 124 may be associated with user profile 501 at cloud based server 102. User profile 501 may comprise user policies 502 and organization policy 504. User identification 118 may correspond to user profile 501 and the stored policies for user 116.

User policies 502 may include functions 506. Functions 506 are actions that are invoked when user 116 logs onto a device within system 100. These functions include to enable contact-free printing, to enable automatic log out after job completion, and to enable contact-free scanning User 116 does not need to input anything into the device to begin these actions. Policies 502 may be downloaded to the applicable device and used to instruct the device how to operate. For example, system controller 405 of MFP 106 may implement functions 506 once user 116 logs on.

User policies 502 also include destination settings 508. Destination settings 508 may pertain to a destination or location within system 100 to send scanned documents, print receipts, or other information. For example, a field in destination settings 508 may indicate that the destination for communications with user 116 and scan document 128 is the cloud storage provider of the document management service, or cloud based server 102. Another field may confirm that an email is to be sent to user 116 as well. Thus, user 116 does not need to enter an email at the logged device on where to send scanned documents, receipts, or other information.

Print settings 509 may define parameters for printing documents for user 116 at a printing device or component. Print settings 509 may include certain settings preferred and set by user 116, such as font, type size, line spacing, margins, page numbering, and the like. They also may include a field indicating whether user may print documents in color. Color printing may be costly and limits may be placed on users for color printing. For example, print settings 509 may include a YES in a field for color printing so that user 116 may color print. If this field is NO, then policies 502 may still allow printing for user 116 in monochrome.

User policies 502 also include conditional settings 510. Conditional settings 510 may change the parameters of the policies or override another setting. For example, conditional settings 510 may override destination settings 508. Conditional settings 510 may be used to set a condition to override the destination for scan document 128. The condition may specify that smaller documents, such as those less than 100 kbytes or 1 MB, be sent by email to user 116. The destination field is changed from the one in destination settings 508. This feature may be convenient if user 116 cannot readily access user profile 501 at cloud based server 102. The limit on the size also prevents an email account for user 116 from becoming full with large documents. Conditional settings 510 also includes a destination field having an email address for the documents meeting the condition.

Conditional settings 510 also may be used to prevent printing of documents at devices that may violate the parameters of user account 501. For example, user 116 may not be allowed to color print or is limited to color printing in a draft format to limit ink or toner use at the device, except for small documents. For example, user 116 may not be allowed to color print documents over a certain size, which indicates many graphics and images to color print. Notification 132 may be sent to user 116 if the condition is violated.

Email settings 512 includes a recipient having an email address for user 116. Multiple recipients may be listed along with various email addresses. User 116 may include backup email addresses as well.

Scan settings 514 may invoke settings for scanning documents at scanning device 114 or scanning component 110 of MFP 106. Scan settings 514 allow user 116 to scan at preferred settings without having to interact or input this information into the scanning device. Scan settings 514 may include multiple fields, such as color, scan side, file format, resolution, scan orientation, and original image. In some embodiments, scan settings 514 are applicable for scanning operations taking place using the platen glass or the ADF for the application scanning device or component.

Conditional settings 516, however, may modify scan settings 514. Conditional settings 516 may apply for a component on the scanning device or component. For example, conditional settings 516 may indicate that the ADF has a different scan setting in some instances. Thus, if scan document 128 is placed on ADF 214 of scanning component 110, then a different scan setting will be implemented than the ones outlined in scan settings 514. For example, scan settings 518 for the condition set forth in conditional settings 516 may be two sided scanning when the ADF is the component holding the document. In this manner, user 116 through policies 502 may personalize how documents are printed and scanned at cloud based server 102 and not at the device itself. No commands or instructions need to be entered.

Organization policies 504 may differ from user policies 502 in that they apply to a group or organization. The group may be formed by administrator 130. Groups may be defined by roles within the organization. Alternatively, any criteria may be used to create a group having its own policies. Organization policies 504 may apply to the group and seek to limit the amount of printing or scanning that can be done by the group.

Print limit settings 520 may be defined in organization policy 504. Print limit settings 520 may invoke a function to enable the print limit policy. Fields for print limit settings may include notifying administrator 130 when a limit is reached for the group. For example, the group may only allow 3000 pages to be printed. Alternatively, the policy may only allow a total number of print jobs up to a certain size, such as 100 MB. Once the group prints a total of 100 MB, then the limit is reached. Print limit settings 520 may include the limit as specified by administrator 130. Print limit settings 520 also may include a field to allow some users having admin privileges to exceed the limit. For example, user 116 does not have this privilege and, therefore, will not be allowed to exceed the limit set forth in print limit settings 520.

Scan limit settings 522 also may be defined in organization policy 504. Scan limit settings 522 may invoke a function to enable the scan limit policy. Fields for scan limit settings may include notifying administrator 130 when a limit is reached for the group. For example, the group may only get to scan 5000 pages or 100 MB of data. Once the limit is reached, scanning operations for member of the group are suspended. Scan limit settings 522 may include the limit as specified by administrator 130. Print limit settings 522 also may include a field to allow some users having admin privileges to exceed the scan limit. Referring to policy 504 for user 116 and the applicable group, the disclosed embodiments do not notify administrator 130 when the limit is reached and admin users may exceed the scan limit.

User policies 502 and organization policy 504 may be applied for printing and scanning operations within system 100 to provide a contactless experience. Data flow diagram 530 shows how policies 124 may be used. As shown, user 116 perform action 532 of doing a contact-free log on using card 250. Action 534 retrieves user policies 502 from cloud based server 102. Using the policies, action 536 determines whether contact-free scanning is needed. If yes, then action 538 determines if a scan document 128 is loaded on scanning device 114 or scanning component 110. If yes, then action 540 scans the loaded document with functions and settings invoked by user policy 502.

If action 536 is no then action 542 determines whether contact-free printing is needed. User policy 501 may be checked to see if a print document 126 is listed in the account for printing. Document processing system 100 allows user 116 or administrator 130 to select a list of documents for printing when a printing device or component is accessed. Cloud based server 102 stores the documents until it is told to release the documents to the printing device or component. Action 542 determines if functions 506 allow contactless printing. If no, then action 543 prompts user 116 to manually print documents.

If action 542 is yes, then action 544 obtains organization policy 504. Action 546 prints documents in user profile 501 until the limit is reached as set forth in print limit settings 520. Action 546 may determine if the limit has been reached. Action 548 determines user profile 501 automatically logs out from the device after scan or print job completion, as specified by functions 506 of user policies 502. If yes, then action 550 logs user 116 out of the device or component. If action 548 is no, then action 552 may prompt an input from user 116 on a main screen at the device. For example, if user 116 is using MFP 106, then instructions may be prompted on touch screen 242.

FIG. 6 depicts a flowchart 600 for implementing a hierarchical workflow for contactless document management operations at a device or component according to the disclosed embodiments. Flowchart 600 may refer to FIGS. 1-5 for illustrative purposes. Flowchart 600, however, is not limited to the embodiments disclosed by FIGS. 1-5.

Step 602 executes by logging onto a device within system 100. Alternatively, user 116 may log onto system 100 itself then a device is selected depending on the actions taken later in the process. In the discussion with regard to flowchart 600, an example will be used of user 116 logging onto MFP 106 using contactless input device 1061. User 116 may swipe or insert card 250 into contactless input device 1061 to verify the user identification.

Step 604 executes by determining whether user policies 502 for user 116 enables contact-free scanning MFP 106 may download policies 502 from cloud based server 102 once the obtained user identification is associated with user profile 501. User profile 501 includes user policies 502 and organization policy 504. For initial determination of functions to be invoked, MFP 106 may check to see if the field for contact-free scanning is enabled. Alternatively, cloud based server 102 may perform this step and send an instruction to MFP 106 for the result of the determination along with further instructions on actions to take.

If step 604 is yes, then step 606 executes by checking components of scanning component 110 to determine whether a document is loaded thereon. The disclosed embodiments may check multiple components, such as platen glass 211 and ADF 214 of scanning component 110. Sensors 465 may be provided at MFP 106 to help with these determinations. Upon doing the check, if one of the sensors 465 returns a signal, then a document may be loaded at that component.

If step 606 is yes, then step 608 executes by automatically scanning the document loaded onto scanning component 110. User 116 does not need to press a "start" button or otherwise interact with MFP 106. MFP 106 instructs scanning component to automatically scan the document or documents. Step 610 executes by using scan settings 514 to process the scan job and produce scan document 128. Scan settings 514 also may be provided by user policy 502. User 116 may configure scan settings 514 to his/her preferred settings for scan jobs so that this information does not need to be entered onto MFP 106.

After scanning is complete, scan document 128 is generated. Step 612 executes by determining whether user policies 502 invoke a function to log out from MFP 106 upon completion of the scan job. MFP 106 checks this field of user policies 502 to determine whether to go ahead and automatically log out. Alternatively, MFP 106 may query cloud based server to check this field to determine whether to invoke this function. If no, then flowchart 600 proceeds to step 614 to return to touch to display section 241 and touch screen 242 to prompt user 116 to take further action. If step 612 is yes, then step 616 executes by logging out user 116 from MFP 106.

If steps 604 or 606 are no, then flowchart 600 proceeds to step 618. Step 618 executes by determining whether contact-free printing operations are enabled by user policies 502. MFP 106 may now turn its attention to operations on printing component 108. Thus, the disclosed embodiments may enact a hierarchy in determining what actions to take at MFP 106. In some embodiments, step 618 may execute after scanning operations are completed. If step 618 is no, then step 620 executes by continuing operations at MFP 106 manually. User 116 may be prompted by display section 241 to manually input instructions as policy 502 does not enable contact-free or automatic printing operations.

If step 618 is yes, then step 622 executes by automatically printing print document 126 in user profile 501 for user 116.

The disclosed embodiments share information between cloud based server 102 and the various devices within system 100. User 116 may list documents to be printed using system 100 and the applicable document management system. If contact-free printing is enabled, then MPF 106 may check to determine if any documents are loaded into user profile 501 to be printed. In this example, print document 126 is listed. Multiple documents may be listed, including documents having different parameters or having different finishing instructions.

Step 624 executes while printing documents. Step 624 executes by using print settings 509 for printing print document 126. For example, MFP 106 may check to determine if color printing is enable by print settings 509. If print document 126 include color images, then it may not be printed if print settings 509 do not allow color printing. Other settings may be normal print settings applied by printing component 108.

After printing is complete, print document 126 is made available at MFP 106. Step 626 executes by determining whether user policies 502 invoke a function to log out from MFP 106 upon completion of the print job. MFP 106 checks this field of user policies 502 to determine whether to go ahead and automatically log out. Alternatively, MFP 106 may query cloud based server to check this field to determine whether to invoke this function. If no, then flowchart 600 proceeds to step 614 to return to touch to display section 241 and touch screen 242 to prompt user 116 to take further action. If step 626 is yes, then step 616 executes by logging out user 116 from MFP 106.

Figure 7B:
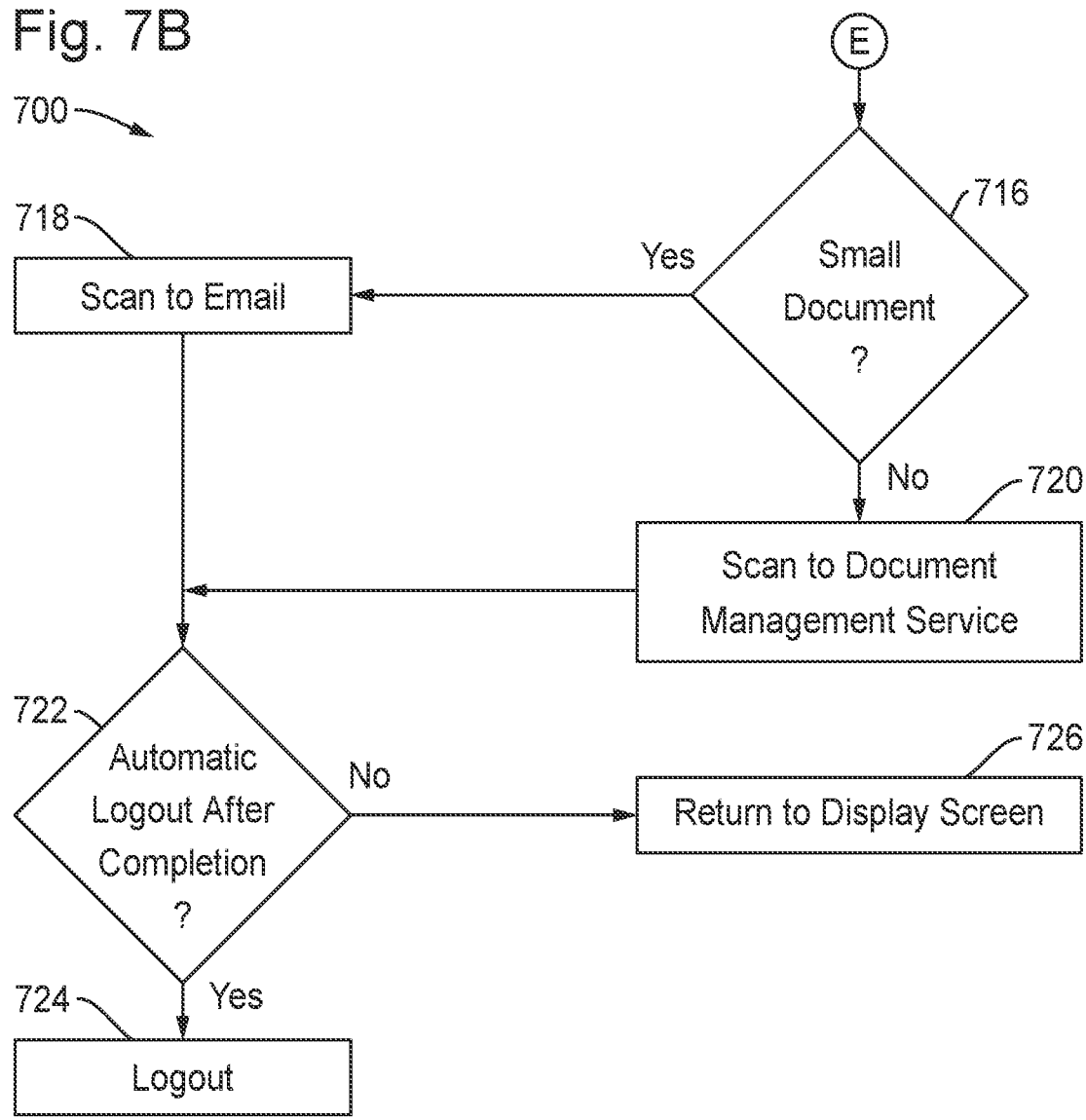
FIG. 7B further illustrates the flowchart for scanning one or more documents using the user policies according to the disclosed embodiments.

FIGS. 7A and 7B depict a flowchart 700 for scanning one or more documents using user policies 502 according to the disclosed embodiments. Flowchart 700 may refer to FIGS. 1-6 for illustrative purposes. Flowchart 700, however, is not limited by the embodiments disclosed by FIGS. 1-6.

Step 702 executes by logging onto a device within system 100. Step 702 may be similar to step 602 disclosed above. For flowchart 700, the processes are disclosed with reference to scanning device 114. User 116 may interact with contactless input device 1141 to provide the user identification corresponding to user profile 501 at cloud based server 102.

Step 704 executes by determining whether user policies 502 invokes a function to enable contact-free scanning at scanning device 114. This step may be similar to step 604 disclosed above. If no, then step 706 executes by continuing to non-scanning operations or manual operation at scanning device 114. A prompt or message may be provided at scanning device 114 to inform user 116 that contact-free scanning is not available.

If step 704 is yes, then step 708 executes by checking scanning device 114 to determine whether one or more documents are loaded thereon. Step 708 may be similar to step 608 disclosed above. Scanning device 114 may include the same components as scanning component 110, including platen glass 211 and ADF 214 as well as sensors 465 to make this determination. Step 710 executes by determining whether the one or more documents are loaded onto the ADF of scanning device 114. The disclosed embodiments may process the one or more documents to be scanned differently depending on where they are loaded without the need for any input or instruction from user 116 at scanning device 114.

If step 710 is no, then step 712 executes by using default scan settings 514 of user policies 504 for user profile 501. As disclosed above, various settings normally provided at scanning device 114 by user 116 are, instead, provided automatically from user policies 502. User 116 may configure scan settings 514 from his/her device and then store the configured settings at cloud based server 102. Scanning device 114 receives user policies 502 once user 116 is verified and acknowledged as being able to scan documents in a contactless manner according to functions 506. In this step, the one or more documents are determined to be on the platen glass, like platen glass 211 disclosed above, and scanned according to the normal scan settings. Flowchart 700 proceeds to step 716, disclosed below.

If step 710 is yes, then step 714 executes by using default scan settings 514 along with ADF-specific settings 516 and 518 configured within user policies 502. For example, ADF-specific settings may include conditional settings 516 and ADF scan settings 518. ADF scan settings 518 include a setting indicating that documents printed from the ADF are to include two-sided scanning. This setting is not applicable to scans from the platen glass, as captured in step 712. Other settings also may be defined in the ADF settings that differ from those in scan settings 514. In the event of a conflicted setting, the settings are mutually exclusive in that the conditional setting takes priority over the general setting.

Step 715 executes by scanning the one or more documents at scanning device 114 using the applicable scan settings as determined according to the disclosed processes. Scan document 128 is generated from the one or more documents loaded onto scanning device 114. Scan document 128 may be a scanned image of the one or more documents.

Step 716 executes by determining whether scan document 128 is a "small" document. The disclosed embodiments may automatically decide where to forward scan document 128 based on different criteria. One criterion may be document size. Large documents should be stored at cloud based server 102 for later retrieval by user 116. Smaller documents may be sent via email to user 116. Thus, scanning device 114 may determine, according to destination settings 508 and conditional settings 510, how to treat scan document 128 without the need for user 116 to input instructions at the scanning device. For example, a small document for scan document 128 may be less than 500 KB.

If step 716 is yes, then scan document 128 is less than 500 KB and step 718 executes by scanning scan document 128 as an attachment to an email to be sent to user 116. User 116 may define the appropriate email address in email settings 512. If step 716 is no, then scan document 128 is equal to or greater than 500 KB. Step 720 then executes by scanning scan document 128 as a file to the document management service at cloud based server 102. Cloud based server 102 may store scan document 128 with user profile 501 for user 116.

Step 722 executes by determining whether the function is invoked to automatically log out from scanning device 114 in accordance with user profiles 502. This step may be similar to step 612 disclosed above. If yes, then step 724 executes by logging out user 116 from scanning device 114 automatically without the need for input by the user or the requirement of waiting for a period of time to log out the user. If step 722 is no, then step 726 executes by returning to the display screen to prompt user 116 into inputting further instructions.

Figure 8:
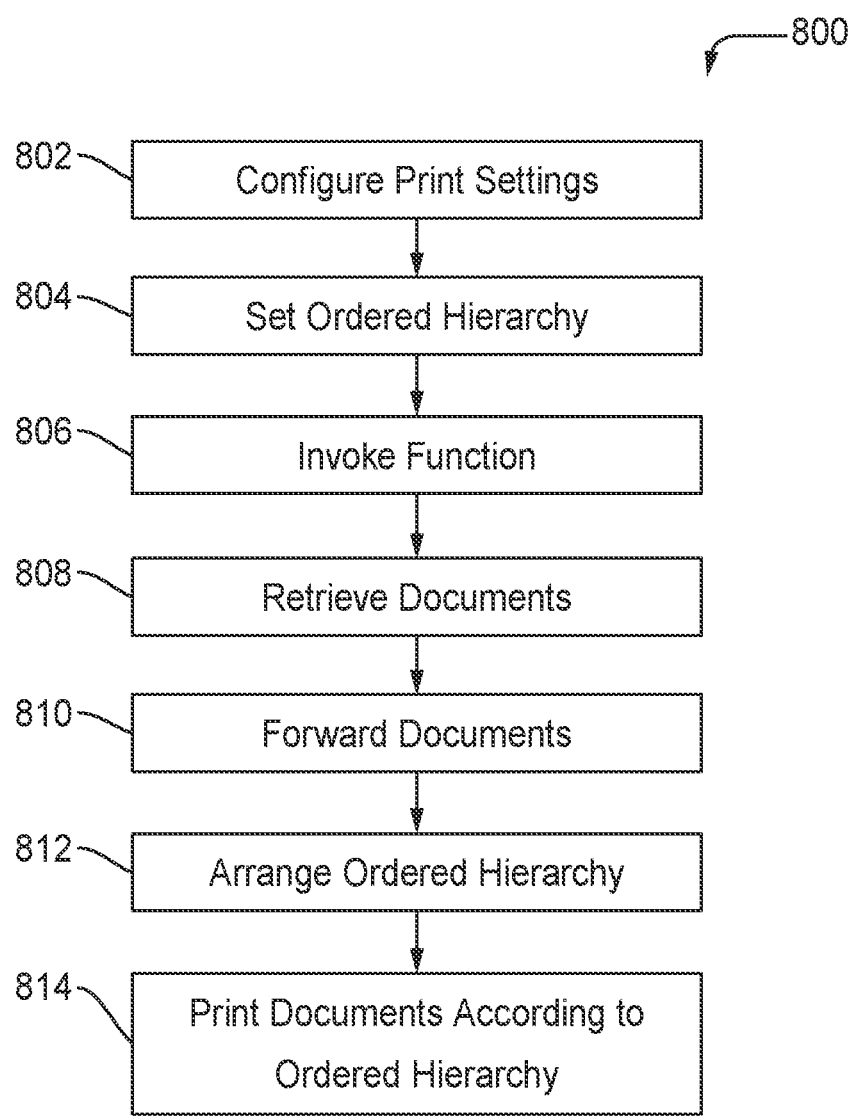
FIG. 8 illustrates a flowchart for printing two or more print documents based on the print settings of user policies according to the disclosed embodiments.

FIG. 8 depicts a flowchart 800 for printing two or more print documents 126 based on print settings 509 of user policies 502 according to the disclosed embodiments. Flowchart 800 may refer to FIGS. 1-7 to better illustrate the disclosed embodiments. Flowchart 800, however, is not limited to the embodiments disclosed by FIGS. 1-7. Flowchart 800 may refer to printing device 112 but the disclosed embodiments also may apply to printing component 108 of MFP 106.

Step 802 executes by configuring print settings 509 by user 116. User 116 may access user policies 502 at cloud based server 102 to configure various settings. Step 804 executes by setting an ordered hierarchy for printing documents for user 116. For example, in those instances of a print job having a plurality of documents, user 116 may set an order to follow while printing, such as printing color documents first. Another example may be printing larger documents first so that documents are ordered from the largest document to the smallest document.

This feature allows user 116 to set an order of printing documents in a contactless manner. User 116 does not need to enter this information at printing device 112. Further, user 116 does not need to set up print jobs individually to print documents in a desired order. Instead, print settings 509 may be configured to set the order of print which then may be applied to any device within system 100. For example, the ordered hierarchy may be imposed at printing device 112 and at printing component 108.

Step 806 executes by invoking a function during a print job at printing device 112 to allow contactless printing according to user policies 502. User 116 may log onto printing device 112 as disclosed above. Printing device 112 accesses user policies 502 from cloud based server 102 as functions 506 allow for contactless printing operations. Step 808 executes by retrieving any documents stored in user policy 501 for printing. User 116 may indicate one or more documents for printing using the document management service supported by cloud based server 102. Preferably, two or more documents are listed by the user for printing using the document management service.

Step 810 executes by forwarding the documents, shown as print documents 126, to printing device 112. Print documents 126 may include a plurality of documents having distinguishing characteristics, such as different sizes, fonts, color images, and the like. Step 812 executes by arranging the documents into a print job order according to the ordered hierarchy. Printing device 112 may arrange the documents to be printed according to the ordered hierarchy in the job queue of the system controller of printing device 112. Step 814 executes by printing print documents 126 at printing device 112 according to the ordered hierarchy. Thus, user 116 may configure how printed documents are processed at a printing device without the need for contact or input after logging onto the printing device.

FIG. 9 depicts a flowchart 900 for implementing limits for scanning or printing operations using organizational policy 504 for contactless document management services according to the disclosed embodiments. Flowchart 900 may refer to FIGS. 1-9 for illustrative purposes. Flowchart 900, however, is not limited to the embodiments disclosed by FIGS. 1-9. Flowchart 900 may refer to MFP 106 but also may apply to printing device 112 and scanning device 114.

Step 902 executes by retrieving organization policy 504 from user profile 501 for user 116. Before this step, user 116 may have logged onto MFP 106 using contactless input device 1061. Even if user policies 502 are not invoked, organization policy 504 may be applied based on the requirements of the organization. In other words, even if contact-free printing or scanning are not invoked, the settings of organization policy 504 may be applied to print and scan operations in order to reduce the amount of contact between user 116 and MFP 106. Further, it may prevent user 116 from ignoring or working around the limitations imposed by organization policy 504.

Step 903 executes by invoking a function to enable a print limit or scan limit policy according to organization policy 504. The fields for these functions are marked to enable the limits. Organization policy 504 may limit the number of sheets, impressions, ink, toner, or other consumable to be used in printing operations for a group or organization. Administrator 130 may set these limits in order to meet cost constraints. Organization policy 504 also may limit the number of sheets, images, or size of information scanned by a group or organization. Again, administrator 130 may set these limits to meet constraints imposed by cloud based server 102. Cloud based server 102 may only be able to store so many documents or so much data.

Step 904 executes by compiling the print or scan information for the group or organization upon user 116 logging onto MFP 106. The disclosed embodiments may compile the information for user 116 as well as other users within the organization. Compiled print information or compiled scan information may be determined. Cloud based server 102 may perform this function and then provide the applicable information to MFP 106. Alternatively, MFP 106 may query cloud based server 102 for this information as it should have records for print and scan jobs performed in system 100 for the organization.

Step 906 executes by determining whether the compiled print or scan information exceeds the limit set forth by organization policy 504. Print limit settings 520 may include a print limit of 1000 pages per month for the organization. Scan limit settings 522 may include a limit of 1 terabyte (TB) of information scanned per month for the organization. Step 906 compares the compiled information for the organization to these limits for the job received at MFP 106 to see if one or more of the limits are exceeded.

If step 906 is no, then step 908 executes by allowing the print or scan operation to proceed at MFP 106. After the operations are complete, then flowchart 900 may implement logging out determination steps, such as steps 612 and 626 disclosed above.

If step 906 is yes, then step 910 executes by determining whether organization policy 504 allows user 116 to exceed the limit according to either print limit settings 520 or scan limit settings 522, depending on the operation being performed. For example, referring to FIGS. 5A, 5B, and 5C, print limit settings 520 do not allow user 116 to exceed the print limit for the organization yet scan limit settings 522 do allow user 116 to exceed the scan limit for the organization. Thus, whether user 116 is allowed to exceed organizational limits may be determined based on the type of operation being attempted. If step 910 is yes, then flowchart 900 proceeds to step 908.

If step 910 is no, then step 912 executes by determining whether MFP 106 or user based server 102 is enabled to notify administrator 130 that the limit for the organization is exceeded. A setting in print limit settings 520 or scan limit settings 522 is checked to see if this process is allowed. Referring to FIG. 5, print limit settings 520 may enable notification upon reaching the limit for the organization while scan limit settings 522 do not enable such notification. If step 912 is yes, then step 914 executes by sending notification 132 to administrator 130 that the limit for a printing or scanning operation is exceeded for the organization. Administrator 130 then may take further action, such as sending alerts to the users within the organization, or adjusting the limits. If step 912 is no, then step 916 executes by stopping the operations. An alert may be sent to user 116. Flowchart 900 may implement logging out determination steps, such as steps 612 and 626 disclosed above.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of the present invention may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams or flowchart illustration, and combinations of blocks in the block diagrams or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an" and "the" are intended to include plural forms as well, unless the context clearly indicates otherwise. It will be further understood that the terms "comprises" or "comprising," when used in this specification, specify the presence of stated features, integers, steps, operations, elements, or components, but do not preclude the presence or addition of one or more other features, integers, steps, operations, elements, components, and/or groups thereof.

Embodiments may be implemented as a computer process, a computing system or as an article of manufacture such as a computer program product of computer readable media. The computer program product may be a computer storage medium readable by a computer system and encoding computer program instructions for executing a computer process. When accessed, the instructions cause a processor to enable other components to perform the functions disclosed above.

The corresponding structures, material, acts, and equivalents of all means or steps plus function elements in the claims below are intended to include any structure, material or act for performing the function in combination with other claimed elements are specifically claimed. The description of the present invention has been presented for purposes of illustration and description, but is not intended to be exhaustive or limited to the invention in the form disclosed. Many modifications and variations will be apparent to those of ordinary skill without departing from the scope and spirit of the invention. The embodiment was chosen and described in order to best explain the principles of the invention and the practical application, and to enable others of ordinary skill in the art to understand the invention for embodiments with various modifications as are suited to the particular use contemplated.

One or more portions of the disclosed networks or systems may be distributed across one or more printing systems coupled to a network capable of exchanging information and data. Various functions and components of the printing system may be distributed across multiple client computer platforms, or configured to perform tasks as part of a distributed system. These components may be executable, intermediate or interpreted code that communicates over the network using a protocol. The components may have specified addresses or other designators to identify the components within the network.

It will be apparent to those skilled in the art that various modifications to the disclosed may be made without departing from the spirit or scope of the invention. Thus, it is intended that the present invention covers the modifications and variations disclosed above provided that these changes come within the scope of the claims and their equivalents.

The invention claimed is:

1. A method for scanning documents at a scanning device, the method comprising:
   associating a user identification with a user profile at a scanning device, wherein the user identification is entered using a contactless input device at the scanning device;
   accessing the user profile at a cloud based storage separate from the scanning device and the contactless input device, wherein the user profile includes a document management policy;
   determining a document to be scanned at the scanning device, wherein the document to be scanned is loaded onto a component of the scanning device;
   invoking a function for scanning the document according to the document management policy;
   instructing the scanning device to execute the function by the document management policy from the cloud based storage;
   specifying scan settings by the document management policy based on the component of the scanning device;
   scanning the document by the scanning device; and
   forwarding the document from the scanning device according to the document management policy.

2. The method of claim 1, wherein the function includes enabling scanning of the document.

3. The method of claim 1, wherein the function includes logging out of the user account upon completion of scanning the document.

4. The method of claim 1, further comprising specifying a destination for the document according to the document management policy.

5. The method of claim 1, wherein specifying the destination includes determining whether the document is greater than a size defined by the document management policy.

6. The method of claim 5, wherein the destination is the user account at the cloud storage account if the document is greater than the size.

7. The method of claim 5, wherein the destination is an email account if the document is equal to or lesser than the size.

8. The method of claim 1, wherein the component of the scanning is an automated document feeder, the function instructing the scanning device to use the automated document feeder.

9. The method of claim 1, wherein the component of the scanning device is a platen glass, the function instructing the scanning device to scan the document on the platen glass.

10. The method of claim 1, wherein associating the user identification includes reading a card or scanning a graphic corresponding to the user profile at the contactless input device.

11. The method of claim 1, wherein the document management policy includes at least one user policy and an organization policy.

12. A method for scanning documents, the method comprising:
   associating a user identification with a user profile, wherein the user identification is entered using a contactless input device at a scanning device;
   determining a document is loaded onto a component at the scanning device;
   accessing the user profile at a cloud based storage separate from the scanning device and the contactless input device, wherein the user profile includes a document management policy;
   specifying scan settings for the scanning device according to the document management policy;
   instructing the scanning device to execute a scan function by the document management policy from the cloud based storage;
   automatically scanning the document at the scanning device using the scan settings; and
   forwarding the document to a destination according to the document management policy.

13. The method of claim 12, wherein the scan settings include a resolution for an image of the document.

14. The method of claim 12, further comprising invoking a function to be completed by the scanning device according to the document management policy.

15. The method of claim 12, further comprising specifying the destination to forward the document according to the document management policy based on a size of the document.

16. The method of claim 12, wherein the destination to forward the scanned document is the cloud based storage.

17. A scanning system comprising:
   a cloud based storage, wherein the cloud based storage includes a user profile having a document management policy having scan settings; and
   a scanning device having a contactless input device,
   wherein the scanning device is configured to
   receive a user identification using the contactless input device,
   forward the user identification to the cloud based storage,
   determine a document to be scanned, and
   scan the document using the scan settings according to the document management policy, and
   wherein the cloud based storage is configured to
   associate the user identification with the user profile,
   invoke a function for scanning the document according to the document management policy, and
   instruct the scanning device to implement the function according to the document management policy,
   wherein the cloud based storage is separate from the scanning device and the contactless input device.

18. The scanning system according to claim 17, wherein the function includes configuring the scanning device to enable scanning of the document.

19. The scanning system according to claim 17, wherein the function includes configuring the scanning device to log off the user profile from the scanning device.

20. The scanning system according to claim 17, further comprising a printing device that is configured to print the document according the document management policy associated with the user account.

* * * * *